United States Patent
Kim et al.

(10) Patent No.: US 8,428,469 B2
(45) Date of Patent: Apr. 23, 2013

(54) VISIBLE LIGHT COMMUNICATION METHOD AND APPARATUS

(75) Inventors: Do-Young Kim, Yongin-si (KR);
Eun-Tae Won, Seoul (KR);
Young-Kwon Cho, Suwon-si (KR);
Tae-Han Bae, Seoul (KR); Sun-Gi Gu, Yongin-si (KR); Jae-Seung Son, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 363 days.

(21) Appl. No.: 12/915,810

(22) Filed: Oct. 29, 2010

(65) Prior Publication Data
US 2011/0105134 A1    May 5, 2011

(30) Foreign Application Priority Data
Oct. 31, 2009 (KR) .......... 10-2009-0104700
Jan. 18, 2010 (KR) .......... 10-2010-0004553

(51) Int. Cl.
*H04B 10/00* (2006.01)

(52) U.S. Cl.
USPC ............ 398/172; 398/128; 398/127; 398/130

(58) Field of Classification Search .......... 398/172, 398/118–131
See application file for complete search history.

(56) References Cited

U.S. PATENT DOCUMENTS

| | | | | |
|---|---|---|---|---|
| 4,648,131 A * | 3/1987 | Kawaguchi et al. | .......... | 398/127 |
| 4,962,466 A * | 10/1990 | Revesz et al. | .......... | 705/14.47 |
| 5,959,754 A * | 9/1999 | Sakurai et al. | .......... | 398/99 |
| 6,400,482 B1 * | 6/2002 | Lupton et al. | .......... | 398/140 |
| 6,865,347 B2 * | 3/2005 | Perkins et al. | .......... | 398/172 |
| 7,447,442 B2 * | 11/2008 | Oda et al. | .......... | 398/172 |
| 7,583,901 B2 * | 9/2009 | Nakagawa et al. | .......... | 398/183 |
| 7,969,297 B2 * | 6/2011 | Haartsen et al. | .......... | 340/531 |
| 7,970,537 B2 * | 6/2011 | Ann et al. | .......... | 701/434 |
| 8,019,227 B2 * | 9/2011 | Iizuka | .......... | 398/140 |
| 8,188,878 B2 * | 5/2012 | Pederson et al. | .......... | 340/815.45 |
| 8,248,467 B1 * | 8/2012 | Ganick et al. | .......... | 348/116 |
| 8,295,705 B2 * | 10/2012 | Kim et al. | .......... | 398/103 |
| 2003/0198271 A1 * | 10/2003 | Matveev | .......... | 372/92 |
| 2008/0281515 A1 * | 11/2008 | Ann et al. | .......... | 701/210 |
| 2009/0022112 A1 * | 1/2009 | Shin et al. | .......... | 370/336 |
| 2009/0022496 A1 * | 1/2009 | Shin et al. | .......... | 398/118 |
| 2009/0026978 A1 * | 1/2009 | Robinson | .......... | 315/294 |
| 2009/0041476 A1 * | 2/2009 | Ann et al. | .......... | 398/202 |
| 2009/0129781 A1 * | 5/2009 | Irie et al. | .......... | 398/98 |
| 2009/0157309 A1 * | 6/2009 | Won et al. | .......... | 701/209 |
| 2009/0171571 A1 * | 7/2009 | Son et al. | .......... | 701/208 |
| 2009/0214225 A1 * | 8/2009 | Nakagawa et al. | .......... | 398/191 |
| 2009/0284366 A1 * | 11/2009 | Haartsen et al. | .......... | 340/531 |
| 2010/0148931 A1 * | 6/2010 | Pappu et al. | .......... | 340/10.2 |
| 2011/0069951 A1 * | 3/2011 | Son et al. | .......... | 398/17 |
| 2011/0105134 A1 * | 5/2011 | Kim et al. | .......... | 455/450 |
| 2011/0217044 A1 * | 9/2011 | Kang et al. | .......... | 398/67 |

* cited by examiner

*Primary Examiner* — Agustin Bello
(74) *Attorney, Agent, or Firm* — The Farrell Law Firm, P.C.

(57) ABSTRACT

A method and an apparatus are provided for guaranteeing terminal mobility in a time division visible light communication system. In resource assignment in a position where the visible light communication terminal changes a cell, the terminal is assigned a resource to be used in a next cell in a cell boundary area from a communication coordinator, thereby guaranteeing the continuous mobility. The visible light communication system informs the terminal of cell boundary notice information for easily informing the terminal of the cell definition so that the terminal can recognize that the terminal is currently located in the cell boundary and is necessary to change the resource.

21 Claims, 21 Drawing Sheets

VISIBLE LIGHT COMMUNICATION METHOD AND APPARATUS

PRIORITY

This application claims priority under 35 U.S.C. §119(a) to Korean Patent Applications filed in the Korean Intellectual Property Office on Oct. 31, 2009 and Jan. 18, 2010 and assigned Serial Nos. 10-2009-0104700 and 10-2010-0004553, the contents of which are incorporated herein by reference.

BACKGROUND OF THE INVENTION

1. Field of the Invention

The present invention relates generally to a visible light communication method and apparatus, and more particularly to a method and an apparatus for visible light communication, which can secure continuous service during movement between cells of a visible light communication service using a Time Division Multiplexing (TDM) scheme.

2. Description of the Related Art

Due to improvements in light emitting efficiency and decreases in price for Light Emitting Diodes (LEDs), the LED has been generally introduced into the market of general lighting, which includes the florescent lamp and the incandescence lamp, as well as the market of special lighting, which may include a portable device, a display, an automobile, a traffic light, and an advertising board. Further, due to recent trends, such as the exhaustion of frequencies in the Radio Frequency (RF) band, crosstalk probability between several wireless communication technologies, increased demand for communication security, and the advent of an ultra high-speed ubiquitous communication environment of 4G wireless technology, interest in optical wireless technology compatible with RF technology has increased.

Visible light communication, which transfers information using visible light, is advantageous in that it can accurately recognize a reception range of information because it is possible to view a destination of light or a progress direction of light. Visible light communication is also safe, has a broad use band, and can be used without restriction. Therefore, visible light communication is reliable in a security aspect and can be driven with low power, which is advantageous in a power consumption aspect. In this respect, visible light communication can be applied to a hospital and an airplane where the use of the RF band is restricted, and also can provide additional information service using an electric signboard. Visible light communication is described with reference to the drawings below.

FIG. 1 is a diagram illustrating a visible light communication system using a general Visible Light Communication (VLC). The general VLC system includes a light source 10 functioning as a lighting formed with an LED or a Laser Diode (LD), and transmitting/receiving data using visible light. The general VLC system also includes a VLC terminal 20 including a visible light receiving/transmitting module, which performs data transmission/reception with the light 10. The VLC terminal 20 includes a mobile terminal, such as a mobile phone or a PDA, or a fixed terminal, such as a desktop computer. Further, the VLC can be linked with a communication system using another wired/wireless communication medium, so that it can be used more efficiently.

When it is necessary to provide service using the VLC to a broad space, the multiple light sources 10 are installed within a corresponding space according to a service range of each of the light sources 10. For example, as illustrated in FIG. 2, the multiple light sources 10 can be installed in a ceiling of a single room. Each of the light sources 10 can be installed in a lattice-type pattern with a predetermined interval, considering a service area within which the single light source 10 can provide the light communication service.

As illustrated in FIG. 2, when the multiple light sources in a cell unit are installed with the interval in the general VLC system, the actual service areas of each of the light sources 10 are overlapped, boundaries of the service areas are in contact with each other, or a non-service area is present between service areas of each of the light sources. The ideal state is when the boundaries of the service areas are in contact with each other, but it is difficult to actually realize this state. In the general service areas according to the multiple light sources, an overlapped area in which the service areas are partially overlapped exists or a non-service area exists between two service areas.

However, when the multiple light sources having the partially overlapped service area provide different kinds of services, data transmitted by the two services collide in the overlapped region, making it impossible to provide the regular service.

In order to provide the regular service in the overlapped area, different time slot resources are used in adjacent cells, and the adjacent cells avoid the overlapped portion in time during the communication, thereby reducing inter-cell interference.

When a cell size increases in the VLC, the interference between the adjacent cells or the support of the terminal mobility is effective, but the entire efficiency of the system is deteriorated. Further, when a cell size decreases, the efficiency of the system is improved, but the inter-cell hand-off and the interference between adjacent cells increase.

Further, when the continuous mobility is decreased, the continuous mobility can be secured in using the time resource which is the same as the time slot resource used in a previous cell. However, when another user uses the time resource, which has been used in the previous cell, in a mobile cell, it is difficult to support the continuity.

SUMMARY OF THE INVENTION

The present invention has been made to address at least the above problems and/or disadvantages and to provide at least the advantages described below. Accordingly, an aspect of the present invention provides a method and an apparatus capable of continuously providing the terminal mobility in the VLC service.

Another aspect of the present invention provides a method and an apparatus, which can reduce inter-cell interference and support the efficient mobility of a system, without changing a cell size, in the VLC service.

According to an aspect of the present invention, a visible light communication method is provided in a visible light coordinator, which discriminates between at least one communication area cell including at least one light source and a boundary area positioned between the communication area cell and another communication area cell adjacent to the communication cell area and which provides time division visible light communication. A position of a visible light communication terminal is detected. A first communication area cell corresponding to the position of the detected visible light communication terminal is determined. A first time slot for receiving data of the visible light communication terminal in the first communication area cell is determined. When the visible light communication terminal is located in a boundary area of the first communication area cell, a second time slot, which has not been assigned to the visible light communication terminal, is assigned to the visible light communication terminal. The visible light communication terminal is communicated with by using the second time slot.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
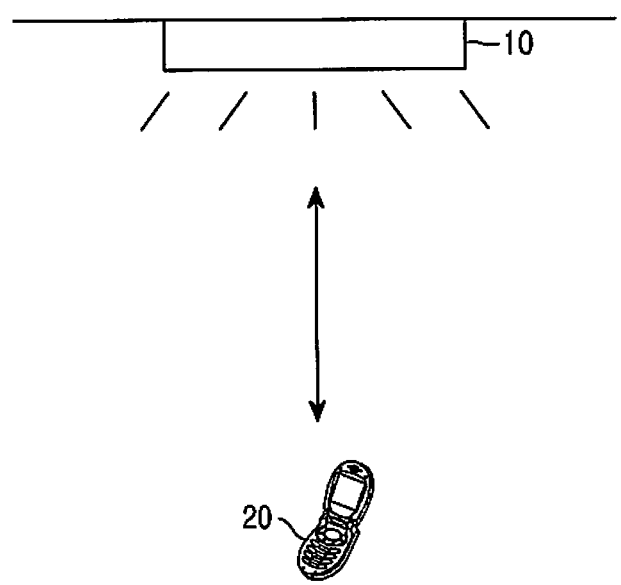
FIG. 1 is a diagram illustrating the construction of a general VLC system.
Figure 2:
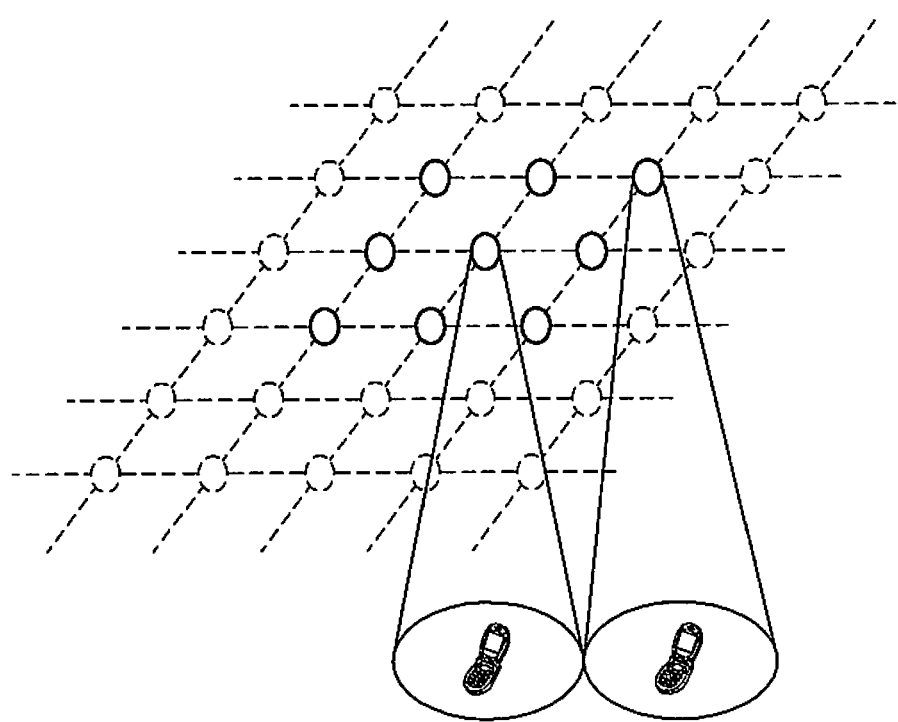
FIG. 2 is a diagram illustrating an example of a VLC system in which multiple light sources are arranged.

Embodiments of the present invention are described in detail with reference to the accompanying drawings. In the following description, the same or similar elements may be designated by the same or similar reference numerals although they are shown in different drawings. Detailed descriptions of constructions or processes known in the art may be omitted to avoid unnecessarily obscuring the subject matter of the present invention.

A VLC system according to an embodiment of the present invention transmits data by using a time division multiplexing scheme. Specifically, the VLC system transmits multiple pieces of data after dividing the data according to uniform time slots, so as to configure a single cell including a single light source or multiple light sources, thereby multiplexing the data with multiple channels.

The light source according to the present invention is a set of devices including at least one light emitting device and at least one photosensitive device. The VLC assigns a time slot resource for each of the users, each of the user services, or each of the contents of the VLC, so that it efficiently and variously transmits data through multiple channels. The VLC system includes a cell including at least one light source, and discriminates and provides the user service in a unit of the cell. The single cell can provide at least one user service. The user service transmits any kind of data to the VLC terminal, and can be classified based on a kind of content to be transmitted, a data transmission scheme including broadcasting or multicasting, or a user. All of the light sources included in the single cell transmit identical data by using a specific downlink time slot resource. Therefore, in the event that the light sources are included in the identical cell, even when the light sources are different from each other, the light sources can transmit the identical data.

The assignment of the time slot resource in the VLC system, according to an embodiment of the present invention, can be dynamically changed according to a characteristic of the user service or a communication environment during the provision of the identical user service. Further, the light sources and the number of light sources included in the single cell can be dynamically changed according to a characteristic of the user service or a communication environment during the provision of the identical user service. Further, the light sources included in the single cell can be physically adjacent or not-adjacent to each other. The cell is not fixed and is formed by a logical mapping for the light sources, not by a physical position of each of the light sources.

The light sources may be connected with a single base station or multiple base stations. When the light sources are connected with the multiple base stations, the VLC system includes a controller for controlling the connection between the light sources and the multiple base stations.

A system for providing the VLC service supporting mobility in a time division VLC system, according to an embodiment of the present invention, includes at least one light source, which transmits data received from at least one VLC terminal located in its service area of the VLC system to a communication coordinator and transmits data received from the communication coordinator to at least one VLC terminal. The system for providing the VLC service, according to an embodiment of the present invention, includes a VLC system including a controller and a terminal. The controller makes a control such that at least one light source to be included in a single cell according to the generated user service from one or more light sources is determined and grouped, and the grouped cells into the single cell is mapped to constitute a cell by assigning an identical ID or different IDs to the light sources included in each cell. A predetermined time slot or at least one time slot is assigned to each cell. The time slot to be used for providing the generated user service is assigned to the cell. Data related to the generated user service is transmitted to a corresponding VLC terminal through the light source mapped to the cell by using the assigned time slot resource. In order to support mobility of the terminal, at least one time slot is assigned to a signal transmitted from the light source to the terminal, which is used for the purpose of data service and movement. According to the movement of the terminal from the cell to an adjacent cell, a Photo Detector (PD) and the light source including the PC within each cell, in which the terminal moves, detects a terminal signal and identifies a position of the moving terminal within the cell by using ACK, NACK, and other response messages transmitted from the terminal after the data reception. When the terminal approaches a cell boundary between the current cell and an adjacent cell, the PD and the light source informs the terminal of a fact that the terminal is located in a cell boundary through boundary notice information transmitted from the light source positioned at a boundary area of each cell. The time slot to be used in the adjacent cell, to which the terminal will move, is assigned to the terminal when the boundary notice information is transmitted. The time slot to be used in the cell to which the terminal will move from the cell boundary is assigned and the assigned time slot is used in the next cell for movement of the terminal. The identical time slot is used in the entire cell boundaries in the VLC system. Different time slots are used in each cell. The time slot to be used in the cell to which the terminal will move is assigned in the cell boundary. The time slot to be used in the cell to which the terminal will move is assigned in the current communication cell. Each base station is controlled when there are multiple base stations.

Figure 3:
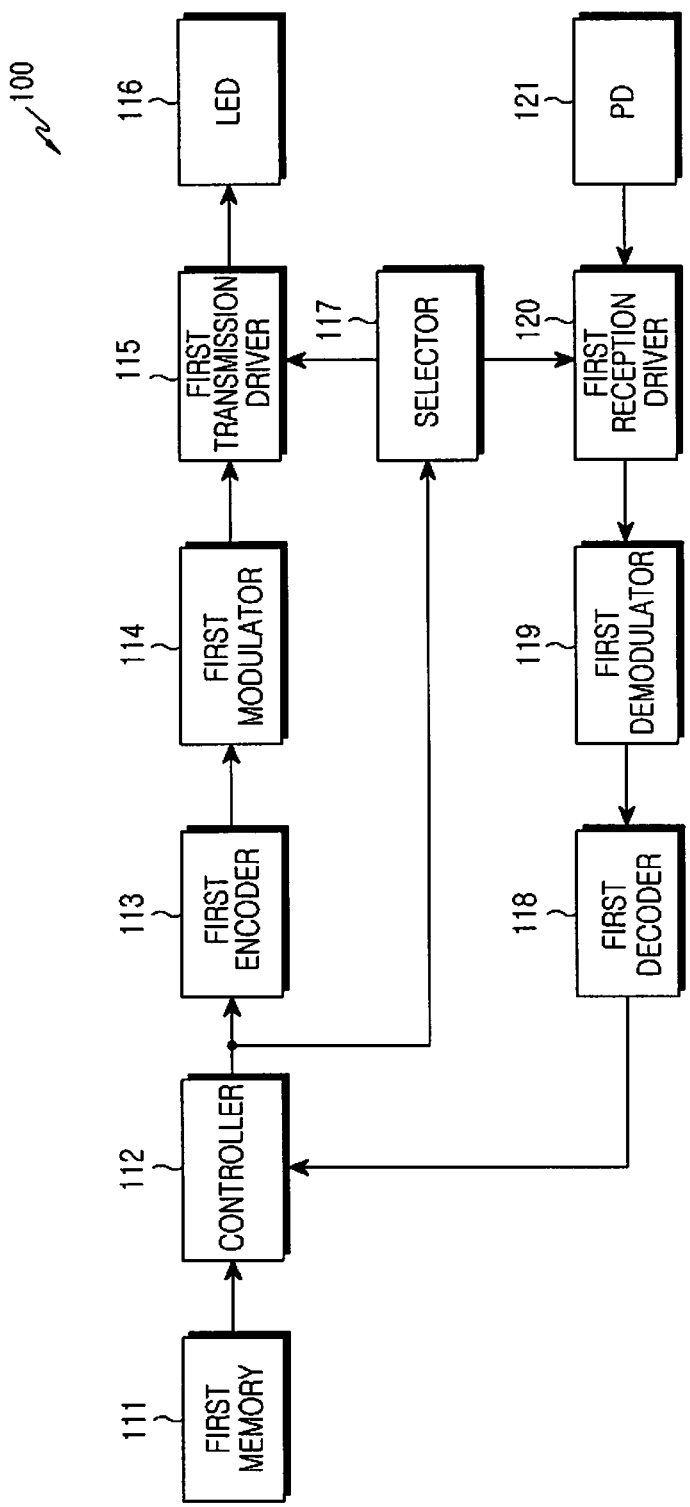
FIG. 3 is a block diagram illustrating a VLC terminal, according to an embodiment of the present invention.

An example of the VLC terminal in the VLC system, according to an embodiment of the present invention, is illustrated in FIG. 3. FIG. 3 illustrates the construction of the VLC terminal.

Referring to FIG. 3, a VLC terminal 100 includes a first memory 111, a controller 112, a first encoder 113, a first modulator 114, a first transmission driver 115, an LED 116, a selector 117, a first decoder 118, a first demodulator 119, a first reception driver 120, and a PD 121.

The controller 112 processes data for transmission/reception data according to the VLC and controls the first encoder 113, the first decoder 118, the first transmission driver 115, and the first reception driver 120, to control the general operation of the VLC terminal 100 as described below according to an embodiment of the preset invention.

The first encoder 113 encodes transmission data inputted from the controller 112 and outputs the encoded data to the first modulator 114. The first modulator 114 modulates the inputted transmission data and outputs the modulated data to the first transmission driver 115.

The first transmission driver 115 serving as a driver of the LED 116 optical-modulates the transmission data inputted from the first modulator 114 and drives the LED 116.

The LED 116 is a light emitting device provided for the transmission of the transmission data to an external apparatus by using an optical signal and is driven by the first transmission driver 115. The VLC terminal 100 can include various kinds of light emitting devices, and each of the light emitting devices has a different supportable wavelength band according to its characteristic.

The PD 121 is a photosensitive device for detecting an optical signal transmitted from the external apparatus. The PD 121 receives an optical signal including reception data from the light source and converts the received optical signal to an electric signal, to output the converted electric signal to the first reception driver 120. The VLC terminal 100 can include various kinds of photosensitive devices, and each of the photosensitive devices has different sensible wavelength band according to its characteristic. Generally, the supportable wavelength band of the light emitting device included in the single VLC terminal 100 is similar to that of the photosensitive device included in the single VLC terminal 100, and thus a kind of wavelength channels usable by the light emitting device and the photosensitive device may be identical to each other.

The first reception driver 120 is a driver for the PD 121, and adjusts a wavelength detection band of the PD 121 according to a wavelength band corresponding to a wavelength channel selected by the selector 117. Further, the first reception driver 120 outputs the electric signal input from the PD 121 to the first demodulator 119.

The first demodulator 119 demodulates the electric signal input from the first reception driver 120 to data according to an optical wireless communication scheme, and outputs the demodulated reception data to the first decoder 118.

The first decoder 118 decodes the input reception data and outputs the decoded data to the controller 112. The controller 112 appropriately processes the reception data input from the first decoder 118.

The first memory 111 stores a program for processing and controlling of the controller 112, reference data, various renewable storing data, etc., and is implemented as a working memory of the controller 112.

Figure 4:
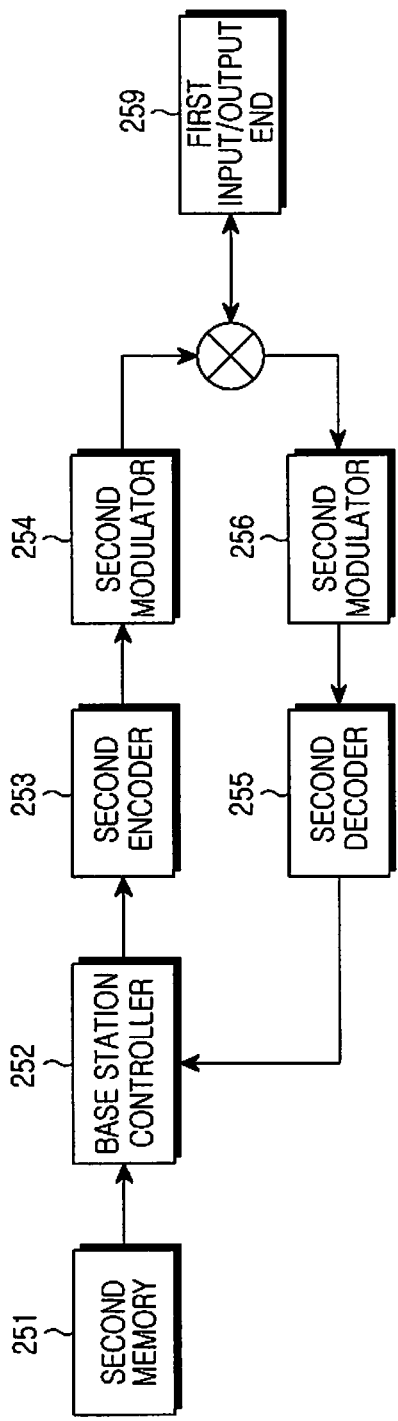
FIG. 4 is a block diagram illustrating the construction of the communication control device, according to an embodiment of the present invention.

The construction of a communication control device, according to an embodiment of the present invention, will be described with reference to FIG. 4. An access point, the base station, or a base station access point present in the following description includes the communication control device of FIG. 4. Therefore, the communication control device corresponds to the access point, the base station, or the base station access point, and they can be treated as identical entities. FIG. 4 illustrates the construction of the communication control device, according to an embodiment of the present invention. The light source connected to the communication control device includes at least one light source functioning as the transmission unit and at least one photosensitive device functioning as the reception unit, the light emitting device may include the LED, etc., and the photosensitive device may include a PD. The photosensitive device and the light emitting device included in the light source is operated and managed under the control of the communication control device, so that they are physically classified, but they can be connected with an electric power line or a data cable or perform the wireless communication.

Referring to FIG. 4, the communication control device, i.e., the access point, includes a second memory 251, a communication controller 252, a second encoder 253, a second modulator 254, a second decoder 225, a second demodulator 256, and a first input/output end 259.

The second encoder 253, the second modulator 254, the second decoder 255, and the second demodulator 256 operate in a manner similar to that of the first encoder 113, the first modulator 114, the first decoder 118, and the first demodulator 119, and serve similar respective functions.

The first input/output end 259 transmits/receives data between the communication control device and the light source, and may include a power line, a wire data cable, or a wireless transmission/reception device.

The second memory 251 stores a program for processing and controlling of the communication controller 252, reference data, various renewable storing data, etc., and is implemented as a working memory of the controller 252.

The communication controller 252 processes data for transmission/reception data according to the VLC, controls the second encoder 253 and the second first decoder 255, and controls the general operation of the communication control device according to the preset invention. Specifically, the communication controller 252 controls every operation necessary for cell mapping and management and the time slot resource change assignment and management, and may control a driving driver of each light source and photosensitive device according to time slot resource change assignment information corresponding to each of the VLC terminals and light sources.

Figure 5:
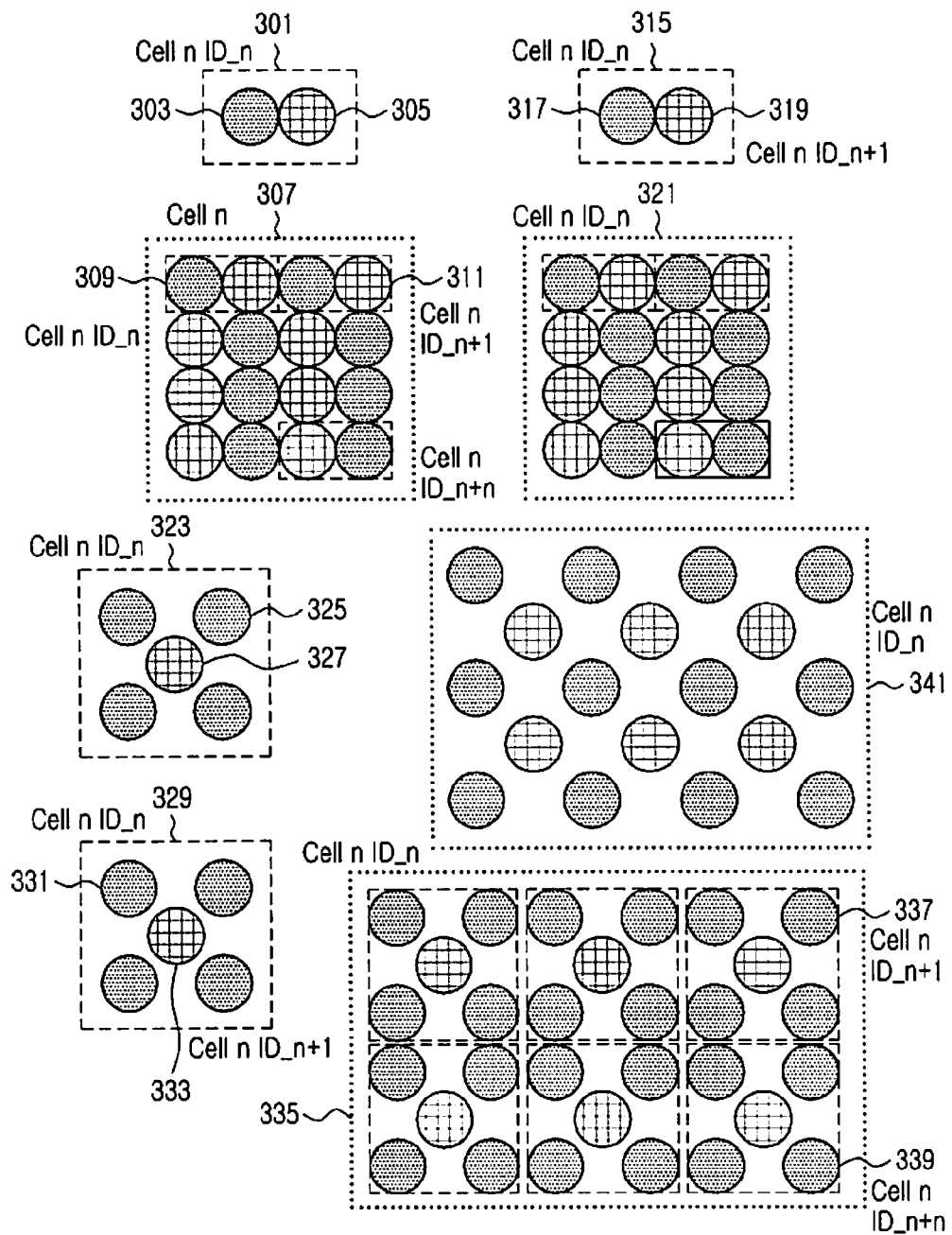
FIG. 5 is a diagram illustrating a cell pattern, according to an embodiment of the present invention.

FIG. 5 illustrates a combination structure of the light emitting device (LED/LD) functioning as the transmission unit and the photosensitive device, e.g. the PD, functioning as the reception unit in the communication control device, i.e. the access point, in which the light emitting device and the photosensitive device constitutes the light source applied to the VLC system.

Further, FIG. 5 illustrates several schemes for assigning a cell ID to each light source. The light emitting device and the PD may be included in a single module according to a manufacturing method. To help understanding of the description, it is assumed that the light emitting device is the LED and the photosensitive device is the PD.

In FIG. 5, a construction cell n ID_n, in which a cell 301 includes a single light source including a first LED 303 functioning as the transmission unit and a PD 305 functioning as the reception unit and the single light source has an independent ID number ID_n within the single cell Cell n, is illustrated. Specifically, an identical cell ID is assigned to the LED 303 and the PD 305.

A cell 307 has the construction in which the multiple light sources having the structure of the cell 301 are combined within the single cell Cell n to constitute a single cell. The transmission unit and the reception unit have a cell ID number, respectively, like a light source 309, a PD 311, and a PD 311 within the cell 307, so that the LED and the PD performing the transmission and reception with the terminal during the communication with the terminal is discriminated using the cell ID number. Further, for terminal mobility provided in the present invention, by using the cell ID number of the LED and the PD within the single cell, the terminal can be aware of a position of the light source and the PD communicated within the cell. A cell 315 includes a single light source having an LED 317 and a PD 319. The LED 317 and the PD 319 have respective cell ID numbers. The cell 315 is illustrated for the purpose of describing the different transmission and reception functions of the LED and the PD of the cell 315 from that of the cell 301. In a cell 321, every light source included in the single cell Cell n has an identical ID number ID_n. A cell 323 includes the single light source including multiple LEDs 325 functioning as the transmission unit and a single PD 327 functioning as the reception unit. The multiple LEDs 325 are bound such that they can operate like the single LED, and the multiple LEDs 325 and the single PD 327 are assigned an identical cell ID number Cell n ID_n. Further, in order to improve a reception efficiency, the light source of the cell can have a construction including the single LED and the multiple PDs according to the construction. In a cell 329, the single light source includes multiple LEDs 331 and a single PD 333. Similarly to the light source of the cell 315, a single cell ID number Cell n ID_n is assigned to the multiple LEDs 331 and a different cell ID number Cell n ID_n+1 is assigned to the PD 333. The light source of the cell 329 can have a construction including the single LED and the multiple PDs according to the construction.

In a cell 335, a plurality of light sources included in the cell 329 are bound, for example light source 337 and 339, to form the single cell Cell n, and each of the light sources are assigned an ID number. In a cell 341 multiple cells including a different ratio between the number of LEDs and the number of PDs constitutes a single cell. The construction method of the cell is varies according to the construction method of the VLC system, but the terminal mobility method suggested in the present invention can be variously applied regardless of the construction of the light source and the PD.

Figure 6:
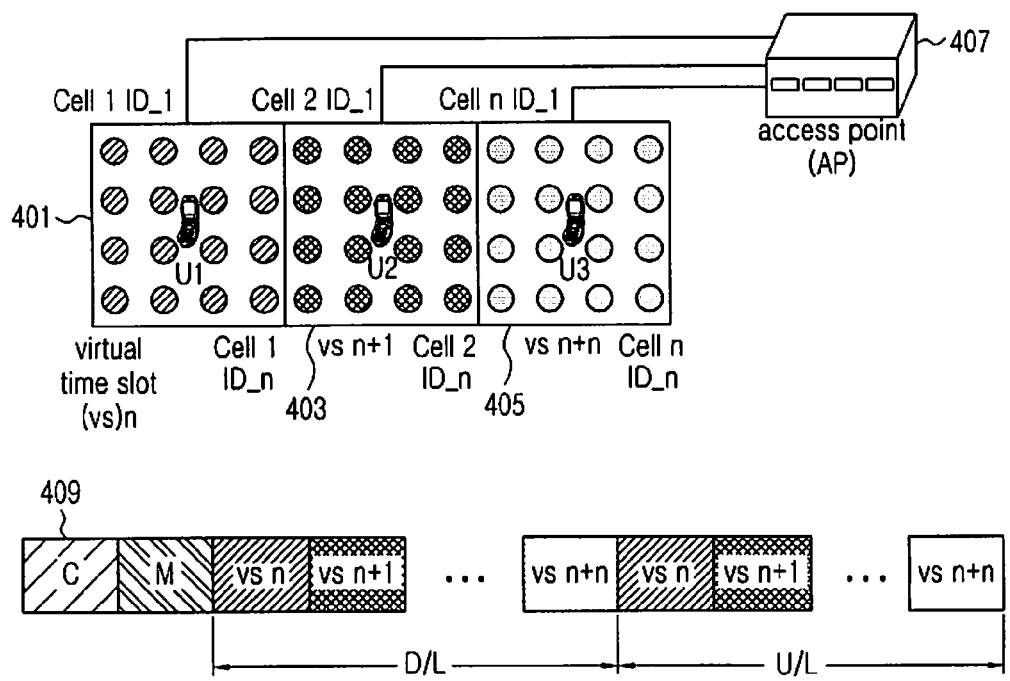
FIG. 6 is a diagram illustrating a cell structure, according to an embodiment of the present invention.

To help understanding of the description, an embodiment of the present invention is described assuming that the single cell ID number is assigned to the light source in which the single LED is bound with the single PD. FIG. 6 illustrates the construction of the VLC system, according to the embodiment of the present invention. As illustrated in FIG. 6, in the VLC system, the multiple light sources are bound and defined as a cell 401, a cell 403, and a cell 405. The multiple light sources included in each cell are assigned a cell ID, to be assigned as the single cell, and the cells are connected with a base station apparatus (or Access Point (AP) 407. Further, each of the cells is assigned in a unit of the time slot resource, like a VLC frame 409, and each cell is used for assigning the time slot resource serving as a communicable time resource to the terminal included in each cell. A terminal U1 included in the cell 401 of FIG. 6 is assigned a virtual time (vs) slot n (vs n) serving as the time slot resource of the VLC frame 409. A terminal U2 included in the cell 403 of FIG. 6 is assigned a vs n+1 serving as the time slot resource of the VLC frame 409. A terminal U3 included in the cell 405 of FIG. 6 is assigned a vs n+n serving as the time slot resource of the VLC frame 409. Therefore, it is possible to avoid interference resulting from simultaneous communication use between the adjacent cells.

The frame 409 is divided into a downlink (D/L) and an uplink (U/L), so that the terminal included in each cell uses the D/L and the U/L in the unit of the time slot resource assigned to the terminal. A scheduling of the time resource assignment is performed in the AP 407. C and M of the frame 409 of FIG. 6 refer to contention information and management information, respectively. C and M have scheduling information of use of cell resource information so that the scheduling information is commonly transmitted to every terminal within the cell. Therefore, the terminals within the cell can identify the time slot resources assigned to the terminals by using the scheduling information.

In FIG. 6, when the VLC system assigns the time resources, the VLC system can assign the fixed time slot resource to each cell, to provide the user terminals within the cell with the service, such as the broadcasting. Further, each cell differently uses the time slot resource without inter-cell interference, so that each cell can assign many time slot resources such that each cell receives multiple user terminals. According to such a method, since each cell transmits different data for each of the user terminals depending on a time, a unicast user, a broadcast user, and a multicast user can be included within a single cell. In order to communicate different user data within the cell with the adjacent cell in such a communication environment without the inter-cell interference, the cell has to use the different time slot resource from that of the adjacent cell, such that it is possible to reduce the inter-cell interference.

Further, because the light sources included in each cell of FIG. 6 have different cell IDs, when the PD included in each light source or the PD included in the cell receives a signal transmitted from the terminal, it is possible to recognize a position of the signal transmitted from the terminal by using the cell IDs.

Figure 7:
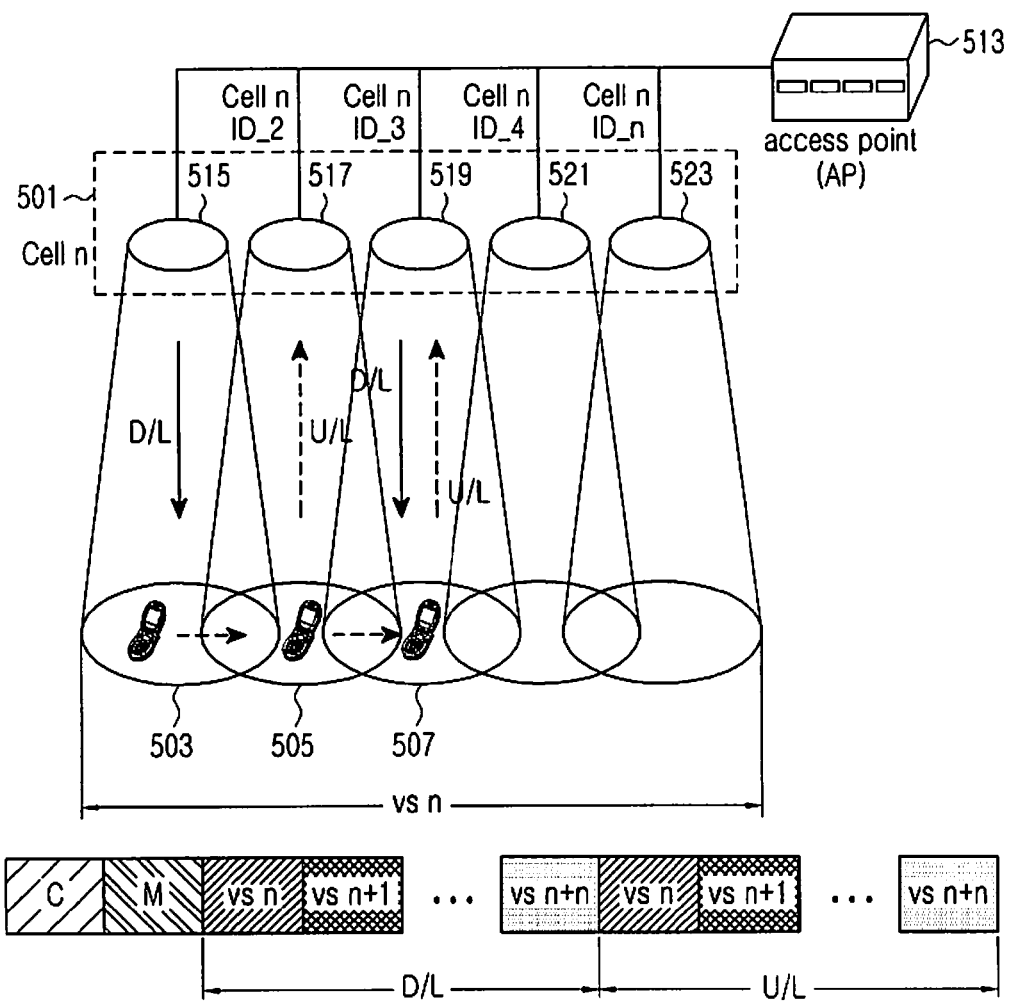
FIGS. 7-10 are diagrams illustrating movement of a terminal between cells, according to an embodiment of the present invention.

FIG. 7 illustrates such a circumstance of the recognition of the position of the signal transmitted from the terminal by using the cell IDs. When each of the light sources 515, 517, 519, 521, and 523 is mapped to a single cell 501, each of the light sources 515, 517, 519, 521, and 523 is assigned a different cell ID, so that it is possible to discriminate each of the light sources included within the identical cell. The cell ID is assigned by an AP 513.

Figure 8:
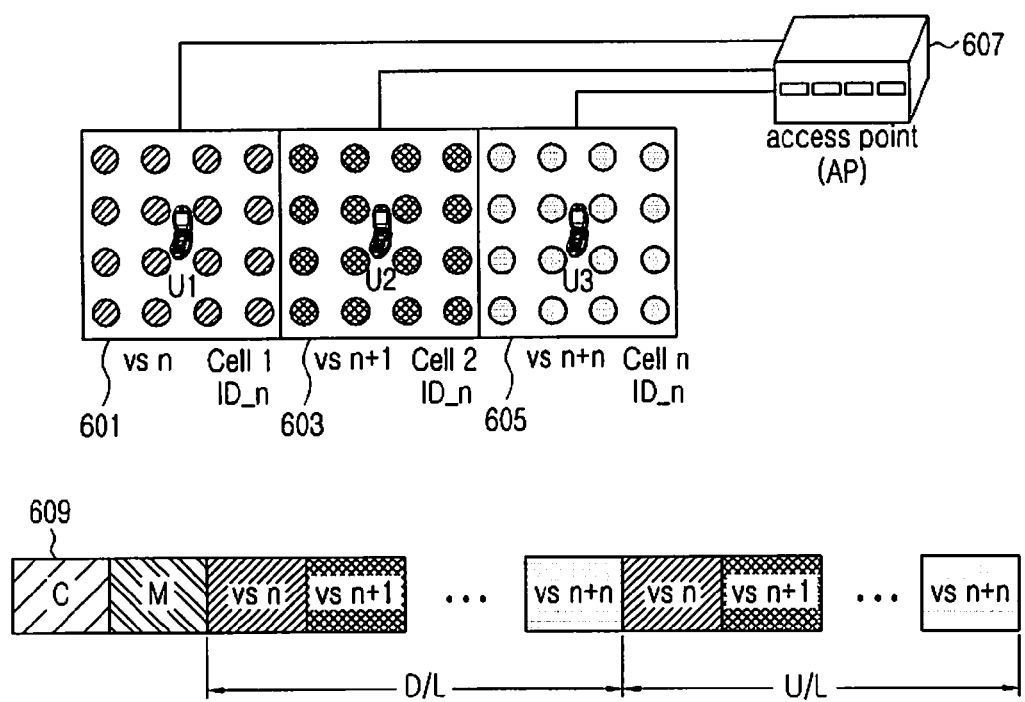

When the terminal U1 moves in a direction of the light sources 515, 517, and 519 included in the cell 501, the terminal U1 can move while receiving services from each of the light sources. When the terminal U1 receives DL data while moving to a service area 503, 505, 507 of each of the light sources 515, 517, and 519 and then transmits an UL signal, i.e. ACK, NACK, or a response signal, in response to the received signal through the UL, the PD belonging to the area 503, 505, 507 of each of the light sources 515, 517, and 519, or a light source including the corresponding PD, can receive the UL signal of the terminal. The AP 513 can recognize a position of the terminal within the cell by using each cell ID mapped to each of the light sources 515, 517, and 519. FIG. 8 illustrates a case where the light sources included in each of the cells use identical cell IDs within each of the cells. A cell 601 is assigned Cell 1 ID_1, a cell 603 is assigned Cell 2 ID_1, and a cell 605 is assigned Cell n ID_1 for use. Further, the terminal U1 included in the cell 601 uses a time slot vs n, the terminal U2 included in the cell 603 uses a time slot vs n+1, and the terminal U3 included in the cell 605 uses a time slot vs n+n for communication. An AP 607 is operated in the unit of a time slot resource like a structure of a frame 609.

Figure 9:
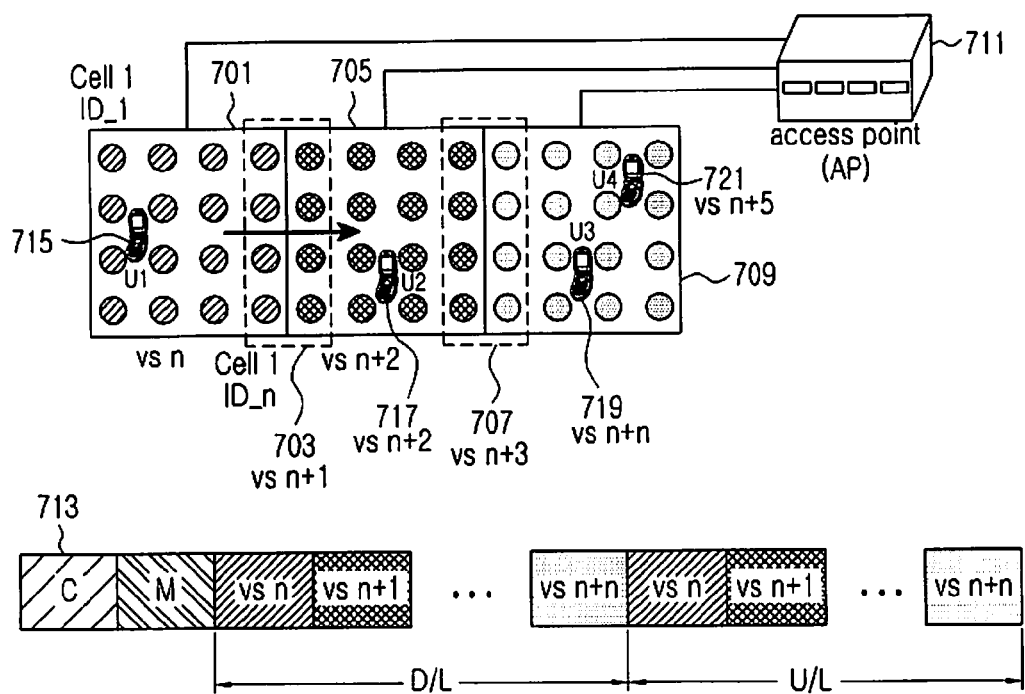

FIG. 9 illustrates the construction of a system for supporting a terminal mobility, according to an embodiment of the present invention. It is assumed that cells 701, 705, and 709 are controlled by a single AP 711 and the system is operated in the unit of a time slot resource like a structure of a frame 713. The frame 713 is divided into a DL and a UL, so that a terminal U1 715 can transmit/receive data in a time slot resource assigned to itself. Further, when each of the cells 701, 705, and 709 is assigned a time slot resource, i.e. a terminal U1 715 in the cell 701 is assigned a time slot vs n, a terminal U2 717 in the cell 705 is assigned a time slot vs n+2, and a terminal U3 719 in the cell 709 is assigned a time slot vs n+n. The terminal U1 715 must be previously assigned a time slot resource to be used in an adjacent cell to move to during the movement from the cell 701 to the cell 705 and the cell 709 for the continuous communication. In order to secure the continuous mobility of the terminal U1 715, the AP 111 assigns a time slot resource to the light sources (boundary light sources) positioned in a cell boundary area, such as boundary areas 703 and 707 of FIG. 9, so as to support the terminal mobility. By assigning the time slot resource, which is not used in the adjacent cell or in the cell including each of the light sources, to the boundary light sources positioned in the cell boundary areas 703 and 707, the terminal mobility can be secured. When the terminal U1 715 is assigned the time slot vs n in the cell 701 and then moves to the cell 705 during the data communication with the AP 711, the U1 passes the boundary area 703. At this time, in order to continuously provide the data service, the terminal U1 has to be assigned the time slot resource available in the cell 705 to move from the AP 711 in the boundary area 703. The information on the time resource assignment is informed to every terminal positioned within the cell by using the M (management) frame in the frame 713 or a control frame that makes a notice of resource information. The time slot resource to be used in the terminal is transmitted to the terminal and the terminal communicates the time slot resource assigned by the AP 711.

As described with reference to FIG. 9, since each of the light sources or the PD included in the light source area has the cell ID and the terminal ID is included in the received terminal signal, the terminal transmits the ACK, the NACK, or the response signal in response to the data received through the DL through the UL and the PD positioned in each of the light sources or the PD positioned in the light source area receives the terminal signal and transfers the received signal to the AP 711, so that the AP 711 can recognize the movement direction of the terminal and the position of the light source. When the terminal is initially set up, the AP recognizes the terminal and assigns the time slot resource to each terminal, so that the AP 711 has been previously aware of the terminal ID. Therefore, when the terminal reaches the boundary area 703, the terminal receives the terminal UL signal in the cell boundary light source and transfers the received signal to the AP 711, so that the AP 711 recognizes the fact that the terminal is positioned in the cell boundary. In this respect, by using the time slot resource assigned to the terminal for the next DL frame, the AP 711 informs the terminal of the fact that the terminal is positioned in the cell boundary through the cell boundary notice information and also simultaneously informs the terminal of information of the time slot resource in which interference with another user is not incurred in the cell to move to, so that the terminal is assigned the time slot resource to be used in the next cell and simultaneously receives the continuous data service from the previous cell. At this time, the terminal communicates with at least two time slot resources, so that the light source included in the cell boundary functions as a bridge resource for the cell change of the terminal. By increasing or decreasing the light source area located in the cell boundary area, it is possible to control the mobility efficiency of the terminal according to the system.

The terminal U1 715 transmits/receives data with the time slot resource assigned in the boundary area 703 in the cell 705 of FIG. 9, and moves from the cell 701 to the cell 705. The time slot resource recourse assigned to the terminal U1 715 in the cell 703 is one of the time slot resources, other than the time slot vs n+2 used by the terminal U2 717 in the cell 705. In FIG. 9, the terminal U1 715 is assigned the time slot vs n in the cell 701 and transmits/receives the data, and when the terminal U1 715 reaches the boundary area 703, the terminal U1 715 is assigned the time slot vs n+1 to be used in the next cell 705 together with the cell boundary notice information, to perform the communication. From the reception moment of the cell boundary notice information, the terminal U1 715 transmits/receives the data by using the two time slots vs n and vs n+1. Further, the terminal U1 715 uses the two time slot resources because it always receives the cell boundary notice when it is positioned in the cell boundary area 703. However, the terminal U1 715 uses different time resources from those of other terminals located in the cells 701 and 705, so that it is possible to provide the continuous data service without interference with the cell and other users.

When the terminal U1 715 is assigned the time slot vs n in the cell 701 from the base station and the terminal U1 715 enters the boundary area 703 during the transmission/reception of the data with the base station, the base station assigns the additional time slot vs n+1 to the terminal U1 715. The terminal U1 715 is assigned the additional time slot vs n+1, other than the time slot vs n+2 used by another terminal U2 717 in the cell 705, and the AP 711 provides the terminal U1 715 with the service by using the two time slots vs n and vs n+1, thereby securing the terminal mobility.

After the assignment of the time resource, the terminal responds to the time resource assignment with confirm response information, the ACK signal, etc. so that the interaction communication link for the assignment of the time slot resource between the base station and the terminal is established.

Further, the time when the terminal uses the two time slot resources begins from the reception of the cell boundary notice information in the boundary area 703. When the terminal U1 715 leaves the boundary area 703 and enters a stable region of the cell 705, the terminal U1 715 cannot receive the cell boundary notice information, so that the terminal U1 715 returns the time slot vs n used in the previous cell and uses the recently assigned time slot vs n+1 in the cell 705. The cell boundary notice information used in the cell boundary informs the terminal of the cell boundary and is used for the purpose of addition or return of the time resource assigned to the terminal together with the information of the time resource change. Additional time slot resource assignment information, which is simultaneously transmitted with the cell boundary notice information transmitted in the cell boundary area, can be transmitted with the cell boundary notice at the same time, or can be assigned within the cell after the reception of the notice information. The return of a specific time slot resource means that the communication does not use the specific time slot resource. The specific time slot resource may be returned according to a request of the terminal. Further, according to the response of the terminal corresponding to the corresponding time slot resource or a kind of light sources receiving the response of the terminal corresponding to the corresponding time slot resource, the return of the time slot resource in the AP can be determined.

After the terminal U1 715 moves from the cell 701 to the cell 705 via the cell 703, when the cell boundary notice information disappears, the terminal U1 715 returns the time slot vs n assigned in the cell 701, thereby granting an opportunity to another user. Further, when the terminal U1 715 moves from the cell 705 to the cell 709, the same method is performed. When the terminal U1 715 communicates with the base station by using the time slot vs n+1 in the cell 705 and then moves to the cell 709, the terminal U1 715 passes by the cell boundary 707. At this time, when the terminal U1 715 reaches the cell boundary area, the cell 709 is assigned a time slot vs n+3 that is one of not-used time slot resources together with the cell boundary notice information, and the terminal U1 715 continues the data service with the base station by using the two time slots vs n+1 and vs n+3, as described in the aforementioned method.

Other user terminals U3 719 and U4 721 are assigned and use time slots vs n+n and vs n+5, respectively, in the cell 709, so that an AP 711 assigns the time slot vs n+3, which is one of time slot resources except for the time slots vs n+n and vs n+5, to the terminal U1 715. The terminal U1 715 transmits a response, the ACK signal, or the like, to the AP 711, to establish the link. Further, when the terminal U1 715 approaches the cell 709, the cell boundary notice information disappears because the terminal U1 715 has left a boundary area 707 at which the cell boundary signal arrives. Therefore, the terminal U1 715 returns the previously used time slot vs n+1, thereby maximizing the time resource utilization of another user. When the cells are separated from each other, like the cell 701 and the cell 709, and the terminal user considers the assignment of the identical data, such as the broadcasting, there is no interference between the time slot resources, so that it is possible to assign the identical time slot resource. Such a process is performed in the AP 711 functioning as the base station.

Figure 10:
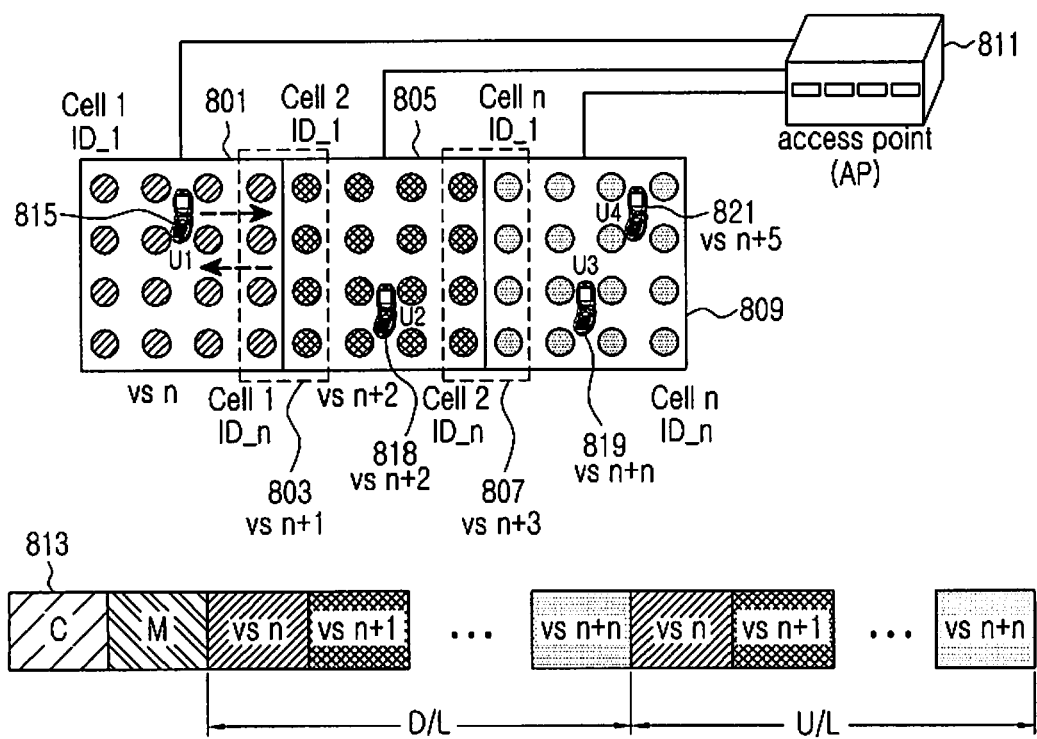

FIG. 10 illustrates a case where a terminal U1 815 is received the cell boundary notice information and is assigned the time slot vs n+1 in a cell boundary area 803 during the movement from a cell 801 to a cell 805 and moves back to a stable region of the cell 801. The frame 813 is divided into a DL and a UL, so that a terminal U1 815 can transmit/receive data in a time slot resource assigned to itself. Further, when each of the cells 801, 805, and 809 is assigned a time slot resource, i.e. a terminal U1 815 in the cell 801 is assigned a time slot vs n, a terminal U2 818 in the cell 805 is assigned a time slot vs n+2, a terminal U3 819 in the cell 809 is assigned a time slot vs n+n and a terminal U4 821 in the cell 809 is assigned a time slot vs n+5. where a terminal U1 815 is received the cell boundary notice information and is assigned the time slot vs n+3 in a cell boundary area 807.

In this case, when the terminal U1 815 leaves the boundary area 803, it fails to receive the cell boundary notice information, so that the terminal U1 815 returns the previously used time slot vs n assigned in the cell 801 and communicates with an AP 811 in the cell 801 by using the time slot vs n+1 assigned in the boundary area 803. Therefore, according to the present invention, the AP 811 has to assign the time slot resource, which is not used in the cells 801 and 805, to the terminal in the boundary area. Further, only when the adjacent cell in which the signal is overlapped does not use the identical time slot resource in the VLC, is it possible to communicate without interference. Therefore, when the terminal U1 815 receives the boundary notice information and is assigned the time slot vs n+1 after entering the boundary area 803 by using the time slot vs n in the cell 801 and then moves back to the stable region of the cell 801, the cell boundary notice information is not received, so that it is recognized that the terminal U1 815 enters the cell. Then, the terminal U1 815 returns the previously used time slot vs n and communicates by using the time slot vs n+1 assigned in the boundary area 803 in the cell 801 in which the movement of the terminal U1 815 starts, so that it is possible to communicate without interference between the adjacent cells. Specifically, the communication without interference between the adjacent cells can be achieved because the time slot resource assigned in the boundary area 803 is the time slot resource that is not used in the adjacent cells. In the event of the broadcast mode, the users included in each cell communicate with the identical time slot resource, so that if the time slot resource is not identical to that of the adjacent cell, there is no interference between the adjacent cells. Further, the identical time slot resources are assigned to the terminals, so that the terminals can communicate with the AP 811 without the interference in the broadcasting mode.

Table 1 represents an example of frame information of the description with reference to FIGS. 9 and 10.

TABLE 1

| Management payload field | bit | usage |
|---|---|---|
| Src_multi_info | n | source multiple channel resource assignment |
| Des_multi_info | n | destination multiple channel resource assignment |
| H_pattern | n | multiple channel hopping |
| VF_info | n | visibility frame notification for resource and destination |
| Src_mode | n | source notifications |
| G_cell_ID | n | granular cell assignment |
| Fractional_Src | n | frame resource notifications |
| Mode_type | n | multicast, broadcast, unicast |
| S_Release_slot | n | start and release slot for broadcast |
| special mobility | n | request special mobility |
| MS_ID | n | terminal ID or user ID |
| # of time slot resource | n | number of time slot resource |
| Cell_info | n | Transmit Cell ID(PD_ID) or AP ID |
| B_info | n | cell boundary information |
| S_info | n | virtual time slot resource assignment |

In order to operate the VLC system as illustrated in FIGS. 9 and 10, the VLC system inserts cell ID information Cell_ID_info, cell boundary notice information B_info, and time slot resource assignment information S_info in the M frame as represented in Table 1, and transmits the information to the corresponding terminal. With regard to the cell boundary notice information B_info, the VLC system can include various constructions of the cells and there is a part in which it is difficult to inform the terminals of the cell or the cell change information, so that the cell boundary notice information B_info is transmitted to the terminal from the AP and informs the terminal of the cell range. Therefore, the terminal receives the cell boundary notice information B_info, so that the terminal can recognize that the terminal is located in the cell boundary and thus it is necessary to change the time slot resource according to the movement to the adjacent cell.

Further, the terminal can recognize the cell to which the terminal belongs or the AP of the base station through the cell ID information Cell_ID_info. The terminal can respond to the received cell boundary notice information B_info with the ID of each terminal or ACK, a general reception response signal, etc. through the UL. The time slot resource assignment information S_info represents the time slot resource assigned for use in the cell, to which the terminal will move, together with the cell boundary notice information B_info that is been received in the cell boundary. Therefore, by using the time slot resource, the terminal is assigned the time slot resource that is not been used in the current cell or the cell to which the terminal will move, so that the terminal can continue the data service with the base station.

The cell ID information Cell_ID_info, the cell boundary notice information B_info, and the time slot assignment information S_info are applied to the user or the terminal included in application terminal information MS_ID included in the frame.

Figure 11:
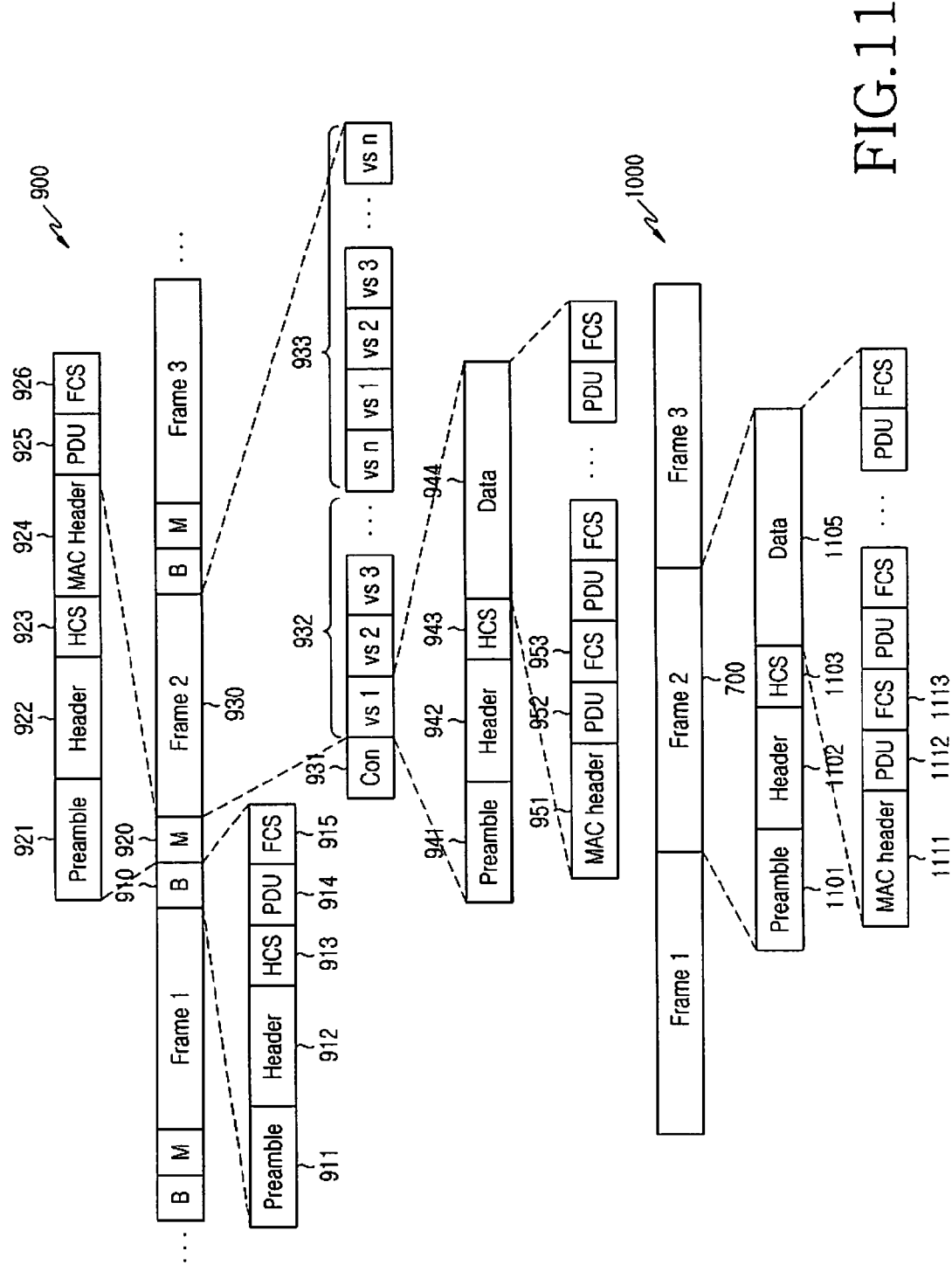
FIG. 11 is a diagram illustrating a frame structure, according to an embodiment of the present invention.

FIG. 11 illustrates an example of the VLC frame capable of including Table 1.

FIG. 11 illustrates a super frame format, according to another embodiment of the present invention. Referring to FIG. 11, a VLC frame 900 includes a beacon field 910, a management field 920 including control information for the VLC, and a data frame 930 including data.

The beacon field 910 includes a preamble 911, a header 912, a Header Check Sequence (HCS) 913, a Protocol Data Unit (PDU) 914, and a Frame Check Sequence (FCS) 915. The preamble 911 includes information determining if the VLC frame 900 communicates using multiple time slot resources. A reception side receiving the VLC frame 900 examines the preamble 911 of the beacon field 910 upon the reception of the frame 900 and interprets the frame 900 in a form of a super frame 1000 when the VLC frame 900 does not use the time slot resource.

The management field 920 includes a preamble 921, a header 922, an HCS 923, a MAC header 924, a PDU 925, and a FCS 926.

The data frame 930 includes a single contention slot 931, a predetermined number of DL time slot resources 932, and a predetermined number of UL time slot resources 933. The DL time slot resources 932 and the UL time slot resources 933 are individually assigned to multiple users when the communication is operated in the broadcast mode.

The single DL time slot resource 932 and UL time slot resource 933 include a preamble 941, a header 942, an HCS 943, and a data field 944. The data field 944 includes a pair including a single MAC header 951 and multiple PDUs 952 and FCSs 953.

The super frame 1000 is the VLC frame in the unicast communication mode, according to the embodiment of the present invention, and includes a preamble 1101, a header 1102, an HCS 1103, and a data field 1105. The data field 1004 includes a pair including a single MC header 1111 and multiple FDUs 1112 and FCSs 1113.

Table 1 can be included in the M field 920.

Further, according to another embodiment of the present invention, a PD payload or the header can include the cell ID information Cell_ID_info, the cell boundary notice information B_info, and the time slot resource assignment information S_info.

Figure 12:
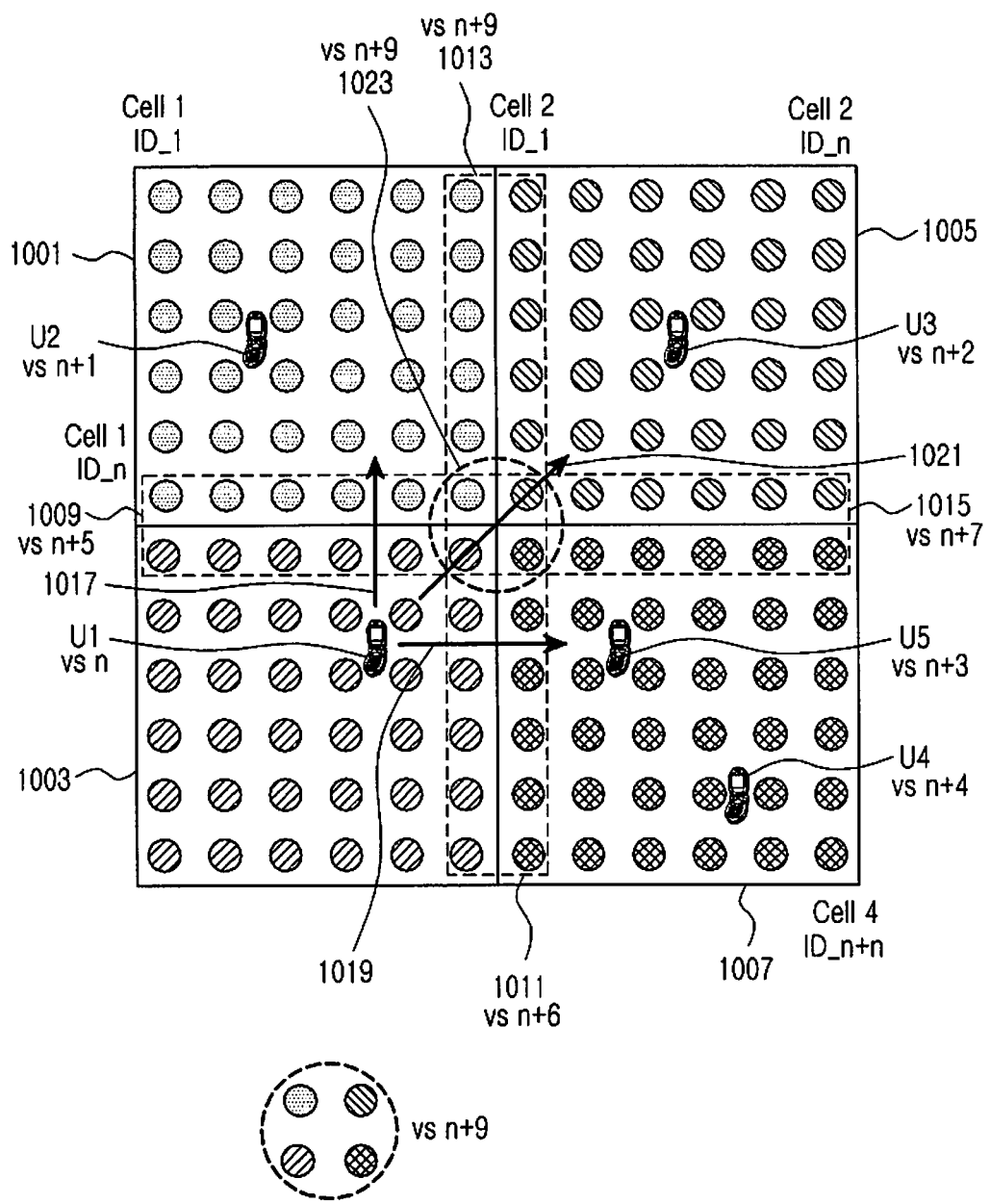
FIGS. 12-15 are diagrams illustrating movement of a terminal between adjacent cells, according to an embodiment of the present invention.

FIG. 12 illustrates the security of the mobility generated when the terminal U1 passes by the cell adjacent area (a boundary area 1009, 1011,1013 and 1015 and an overlapped boundary area 1023) before moving from a cell 1003 to any one of a cell 1001, a cell 1005, and a cell 1007.

When the terminal U1 moves from the cell 1003 to the cell 1001 (in a direction 1017) and from the cell 1003 to the cell 1007 (in a direction 1019), the method illustrated in FIGS. 9 and 10 is applied. However, when the U1 moves from the cell 1003 to the cell 1005 (in a direction 1021), it must pass by an overlapped boundary area 1023 in which all of the cell 1001, the cell 1003, and the cell 1007 are adjacent to each other. Therefore, since the AP has been aware of the light source located in the boundary of each of the cell 1001, the cell 1003, the cell 1005, and the cell 1007 and the ID of the cell including the PD of the light source, the light source, i.e. the PD, in the boundary overlapped area assigns a time slot vs n+9 that is not used in the cell 1001, the cell 1003, the cell 1005, and the cell 1007. This reduces the communication interference in the overlapped light source area. The definition of the overlapped area size can be variously determined according to the system, as similar with FIGS. 9 and 10 in which the size of the boundary area for the overlapped area is varied according to the system condition.

When the terminal U1 included in the cell 1003 arrives at the overlapped boundary area 1023 during the movement to the cell 1005, the terminal U1 receives the cell boundary notice information and is assigned the time slot vs n+9, which is not used in the cell, in the overlapped boundary area 1023 and communicates with the AP of the base station with the two time slots vs n and vs n+9. When the terminal U1 leaves the overlapped boundary area 1023 and reaches the cell 1005, the terminal U1 cannot receive the cell boundary notice information, so that the terminal U1 returns the time slot vs n, which had been used in the previous cell 1003, and communicates with the base station with the time slot vs n+2 in the cell 1005, to continuously communicate.

Further, when the terminal U1 is located in the overlapped boundary area 1023, the movement of the terminal U1 to the cell 1001, the cell 1005, or the cell 1007 is determined by the user of the terminal U1. In this respect, the terminal U1 is assigned the time slot resource that is not used by users U2, U3, U4, and U5 included in the adjacent cell, so that it is possible to communicate without the interference. In FIG. 12, each of the light sources included in the cell 1001, the cell 1003, the cell 1005, and the cell 1007 has a cell ID for discrimination, so that it is possible to discriminate the light source or the PD within each cell. Specifically, it is possible to identify the position of the light source or the PD to which the terminal belongs through the cell ID.

Figure 13:
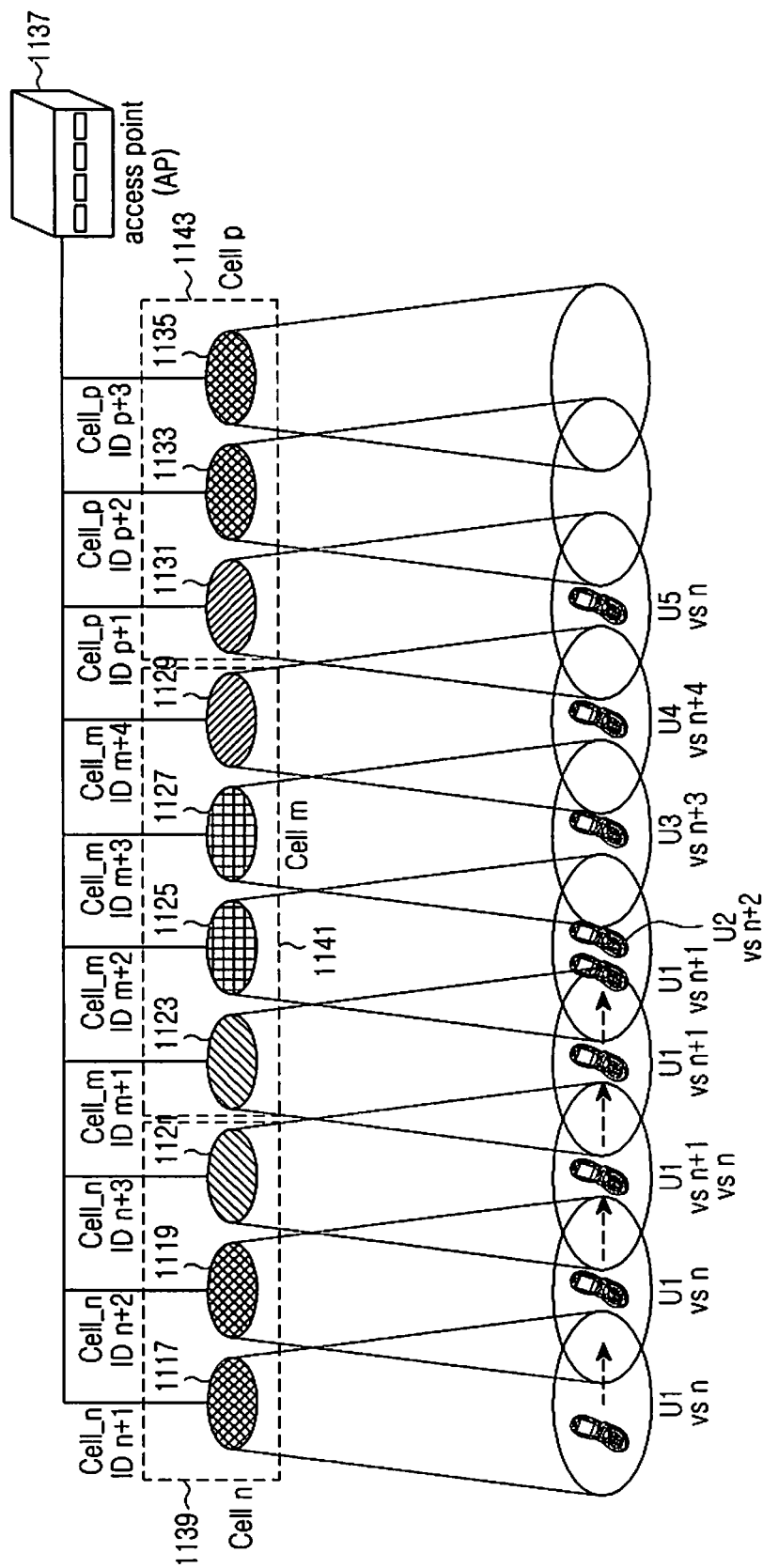

FIG. 13 illustrates another method of returning the time slot resource, which is a resource used in the previous cell, in the cell to which the terminal will move. According to the return method of the time slot resource of FIG. 10, when the terminal U1 moves toward the cell 805 during the communication with the AP by using the time slot vs n assigned in the cell 801, the terminal U1 has to pass by the boundary area 803. In this case, when the terminal U1 approaches the boundary area 803, the terminal U1 receives the cell boundary notice information and is assigned the time slot vs n+1 and then enters the stable region of the cell 805. Thereafter, when the terminal U1 fails to receive the cell boundary notice information transmitted from the boundary area 803, the terminal U1 returns the time slot vs n used in the previous cell 801, thereby granting an opportunity of the time resource assignment to another user. In this method, it is described the method of returning the previous time slot resource and the assigned time slot resource based on the cases where the terminal U1 receives and does not receive the cell boundary notice information in the cell boundary. FIG. 13 illustrates another method of returning the time resource.

In FIG. 13, cell_n 1139 includes light sources 1117, 1119 and 1121, cell_m 1141 includes light sources 1123, 1125, 1127 and 1129, and cell_p 1143 includes light sources 1131, 1133 and 1135.

Figure 14:
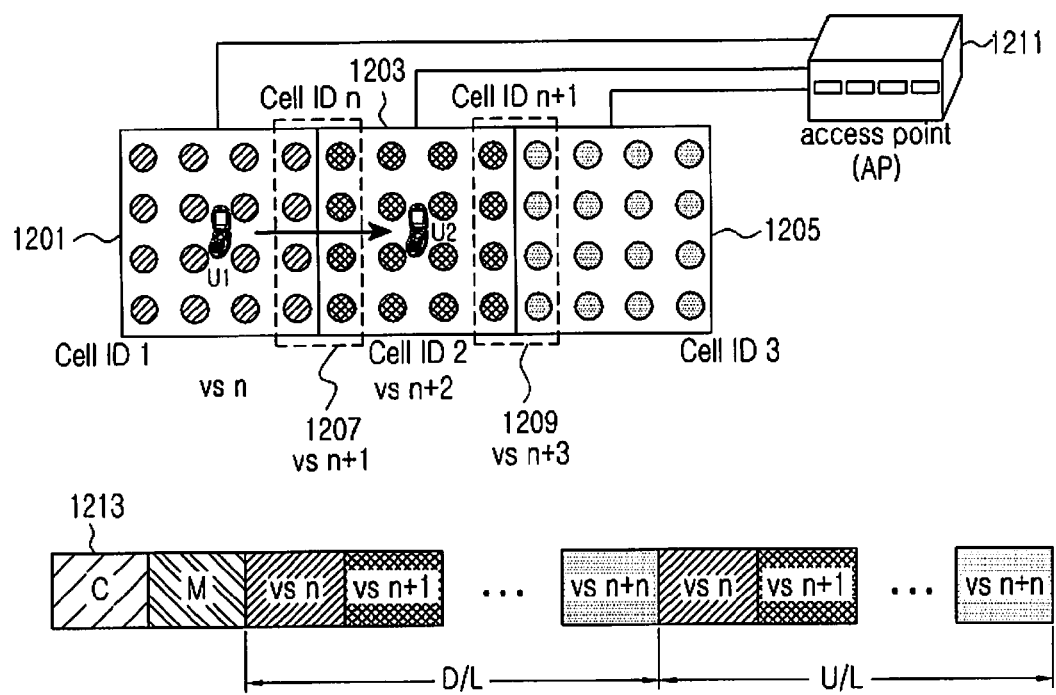

When the terminal U1 moves to the cell and approaches a light source 1121 included in the cell boundary area during the communication with an AP 1137 by using the time slot vs n assigned from light sources 1117 and 1119, the light source 1121 transmits the cell boundary notice information to the terminal U1. The light source 1121 has an ID Cell_n ID n+3. Specifically, the light source n+3 1121 included in a cell Cell_n 1139 transmits the cell boundary notice information to the terminal U1 and the AP 1137 assigns the time slot vs n+1 to the terminal U1. When the terminal U1 continuously moves and approaches a light source 1123 included in the cell boundary area, the light source 1123 transmits the cell boundary notice information by using Cell_m ID M+1, i.e. a light source m+1 1123 included in a cell Cell_m 1141. Therefore, the terminal U1 recognizes that it is included in a different cell by using the light source cell ID because of the different light source ID which transmits the cell boundary notice information, so that the terminal U1 returns the previously used time slot vs n to the base station. Therefore, the terminal U1 communicates with the AP 1137 by using the assigned time slot vs n+1. Further, even if the terminal U5 included in the light source 1131 of a cell 1143 is assigned the time slot vs n identical to that assigned to the terminal U1 in the cell Cell n 1139, it is possible to communicate without the interference because the cells are isolated from each other so as to prevent the cells from being overlapped. By using this method, the VLC reuses the time slot resource, thereby improving the entire capacity of the system. FIG. 14 illustrates a method of securing the mobility in a case where the light sources included in each of cells 1201, 1203, and 1205 have a single cell ID in a unit of the cell, not independent cell IDs. An AP 1211 uses frame 1213. On an assumption that the terminal U1 moves from the cell 1201 to the cell 1203, the light sources included in each of the cells 1201 and 1203 have a cell ID Cell ID 1 and Cell ID 2 in the unit of the cell, so that the terminal U1 cannot identify the position of the movement within the cell with the light source or the light source including the PD. However, because a light source included in a boundary area 1207 has a cell ID Cell ID n, when the terminal U1 approaches the cell boundary area 1207 during the movement from the cell 1201 to the cell 1203, the terminal U1 transmits a signal of the UL response with respect to the DL resource to the light source or the PD included in the light source, so that an AP 1211 recognizes that the terminal U1 is located in the cell boundary. Further, the light source included in the cell boundary area 1207 transmits the cell boundary notice information according to the approach of the terminal U1, so that the terminal recognizes that it is located in the cell boundary. Further, the terminal U1 is assigned the time slot vs n+1 assigned by the AP 1211 and communicates with the AP 1211 with the time slots vs n and vs n+1. Further, when the terminal U1 fails to receive the boundary notice information transmitted from the boundary area 1207 or receives a DL signal transmitted from the cell 1203 by using the time slot vs n+1 in approaching the cell 1203, the terminal U1 returns the time slot vs n assigned in the cell 1201. FIG. 14 illustrates the method of supporting the mobility when the light sources included in the single cell communicate with the identical cell ID.

Figure 15:
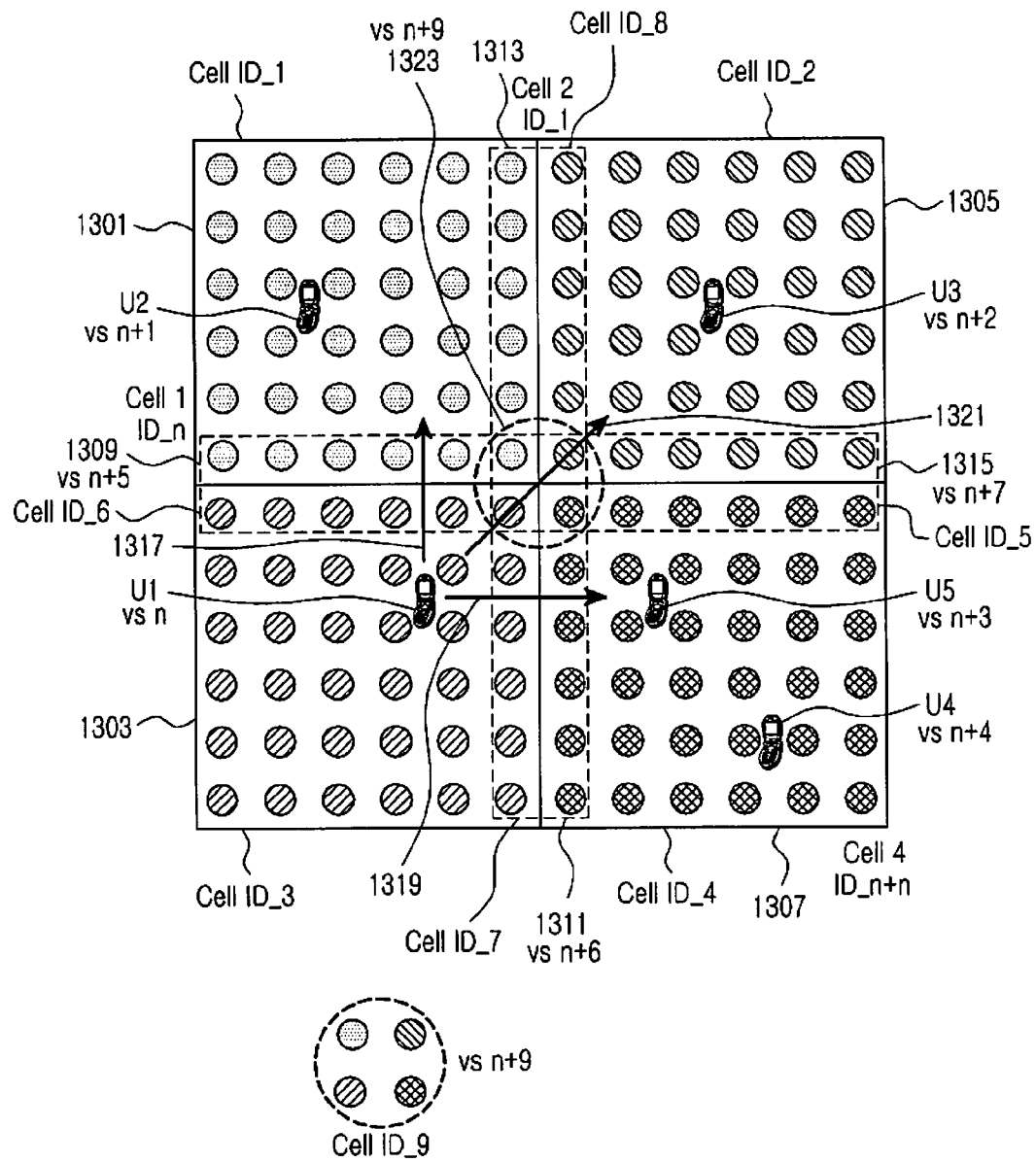

FIG. 15 illustrates the security of the mobility generated when the terminal U1 passes by the cell adjacent area (a boundary area 1309, 1311,1313 and 1015 and an overlapped boundary area 1323) before moving from a cell 1303 to any one of a cell 1301, a cell 1305, and a cell 1307. FIG. 15 illustrates a method of supporting the mobility in a visible light cell environment in which a single cell ID is granted to each cell when the terminal U1 is located in the overlapped boundary area as illustrated in FIG. 12. On the assumption that the terminal U1 moves from a cell 1303 to a cell 1305 (in a direction 1321), the terminal U1 passes by an overlapped boundary area 1323.

Figure 16A:
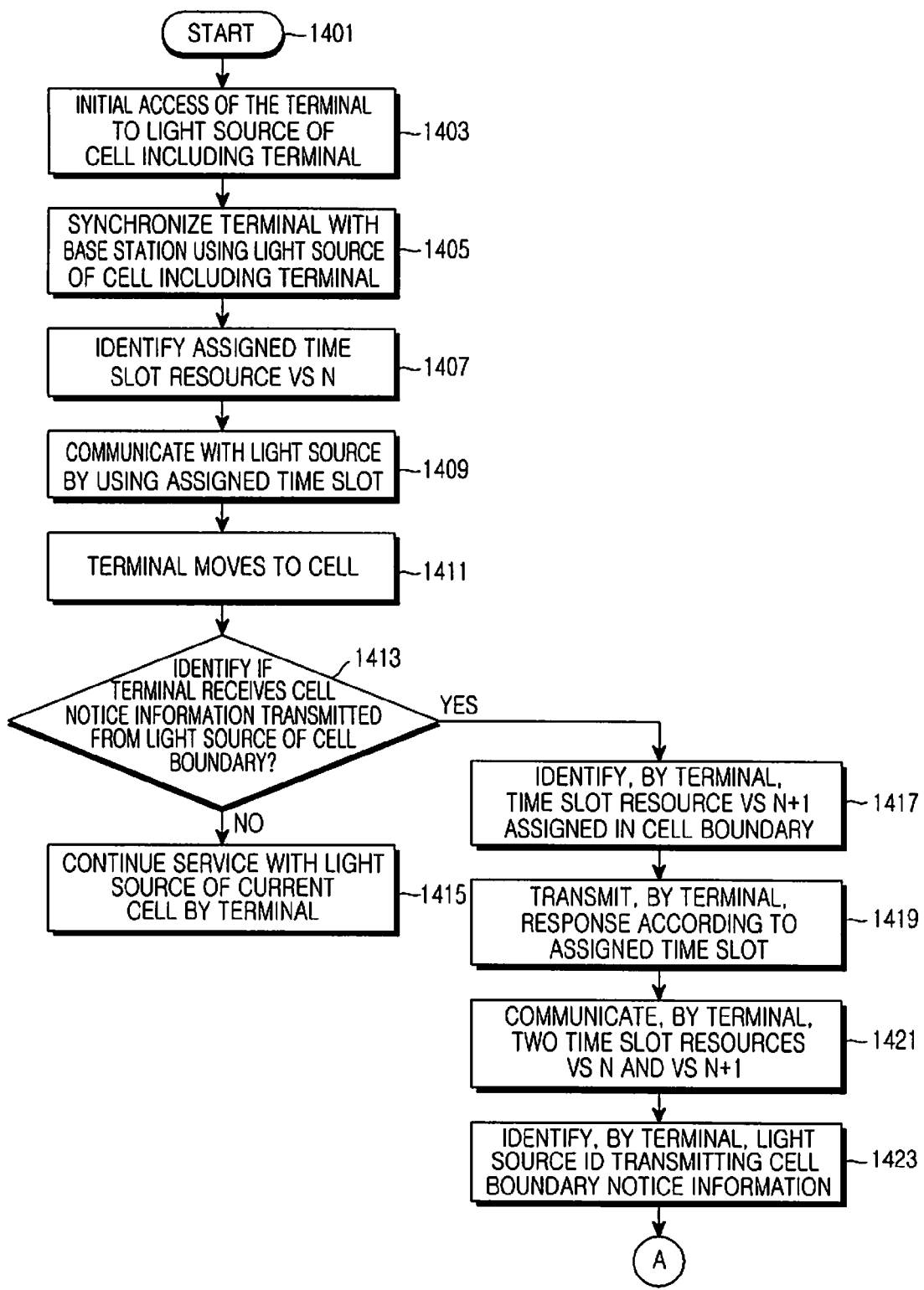
FIGS. 16A and 16B are flowcharts illustrating an operation of a VLC terminal, according to an embodiment of the present invention.
Figure 16B:
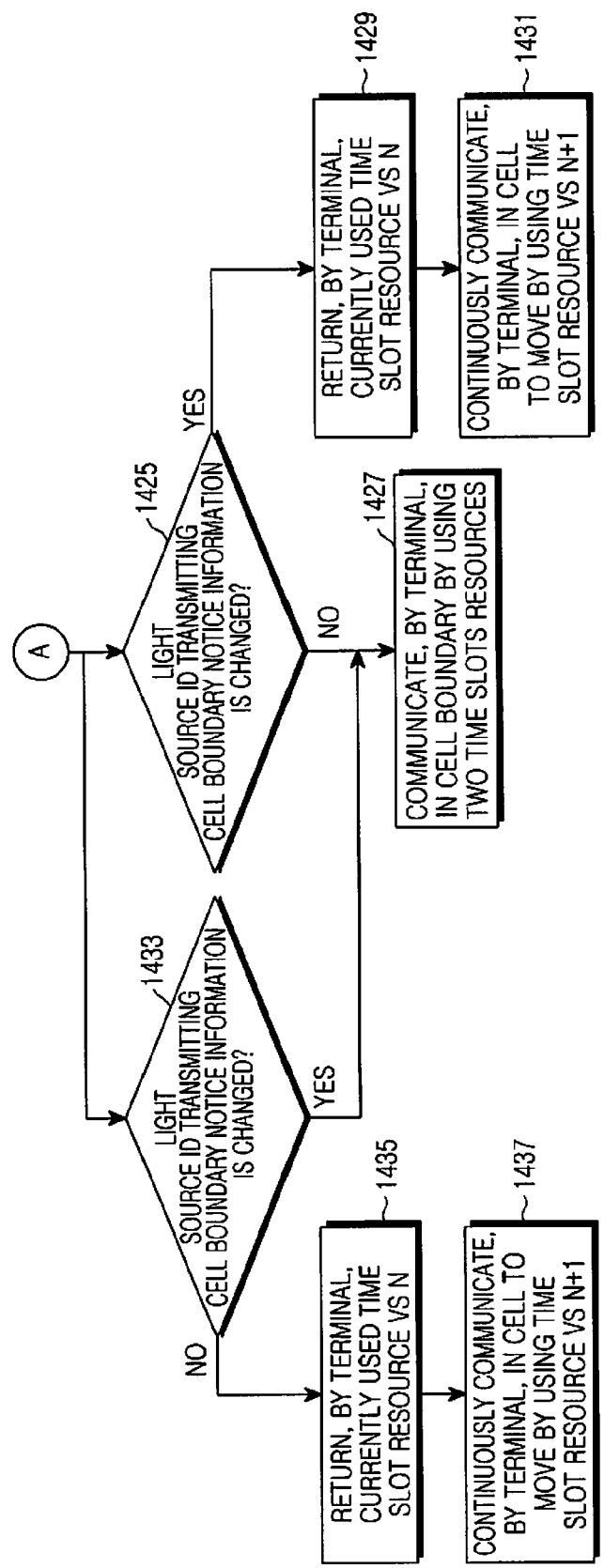

In the overlapped boundary area 1323 in which each of the cells is overlapped with each other, the light source or the PD included in the light source uses a cell ID Cell ID 9, and when the terminal U1 approaches the overlapped boundary area 1323, the light source or the PD included in the light source assigns a time slot vs n+9 by using a cell ID Cell ID 9. Since the light source or the PD included in the light source has the cell ID Cell ID 9, when the terminal U1 is located in the overlapped boundary area 1323, it is possible to recognize the position of the terminal U1 with the terminal UL signal. Therefore, when the terminal U1 is located in the overlapped boundary area 1323, the terminal U1 receives the cell boundary notice information and is assigned the time slot vs n+9 and uses the time slots vs n and vs n+9 in the overlapped boundary area 1323. Further, when the terminal U1 enters the cell 1305 and does not receive the cell boundary notice information from the overlapped boundary area 1323, the terminal U1 returns the time slot vs n assigned in the cell 1303. Therefore, the terminal U1 communicates using the time slot vs n+9 in the cell 1305. The method for securing the mobility with respect to a movement direction 1317 and 1319 of the terminal U1 from the cell 1303 is identical to that illustrated in FIGS. 9, 10, and 12. FIGS. 16A and 16B illustrate an operation of the VLC terminal, according to an embodiment of the present invention. As illustrated in FIGS. 16A and 16B, in step 1403, the VLC terminal initially accesses a light source of a cell to which the terminal belongs. In step 1405, the VLC terminal makes synchronization with the base station AP through the light source that provides the area of the VLC terminal with the VLC service. In step 1407, the terminal identifies an assigned time slot vs n, and in step 1409, the terminal communicates with a corresponding light source by using the assigned time slot vs n. When the terminal moves to the cell in step 1411, the terminal identifies if the cell boundary notice information transmitted from the light source located in the boundary of the cell is received in step 1413. When the boundary notice information is not received, the terminal continues the service with the light source of the current cell in step 1415. However, when the boundary notice information is received, the terminal identifies the time slot vs n+1 assigned in the cell boundary in step 1417. The terminal transmits a response according to the assigned time slot resource in step 1419 and the terminal communicates using the two time slots vs n and vs n+1 in step 1421. Then, the terminal identifies an ID of the light source transmitting the cell boundary notice information in step 1423, to proceed to step 1425. The VLC terminal identifies if the ID of the light source transmitting the cell boundary notice information is changed in step 1425. When the light source ID is not changed in step 1425, the terminal continues the communication by using the two time slot resources in the cell boundary in step 1427. When it is identified that the light source ID is changed in step 1425, the terminal returns the used time slot vs n in step 1429, and continues the communication in the next cell to move to by using the time slot vs n+1 in step 1431.

According to another embodiment of the present invention, the VLC terminal does not return the time slot resource according to the change of the ID of the light source transmitting the cell boundary notice information, but determines the return of the time slot resource based on the reception of the cell boundary notice information, the process of which corresponds to steps 1433, 1435, and 1437.

Specifically, the terminal identifies the ID of the light source transmitting the boundary notice information in step 1423 and proceeds to step 1433. The terminal identifies if the cell boundary notice information is continuously received in step 1433. When the cell boundary notice information is continuously received, the terminal continues the communication by using the two time slot resources in the cell boundary in step 1427. However, when the cell boundary notice information is not received, the terminal maintains the recently assigned time slot resource among the currently used time slot resources and returns the previously assigned time slot vs n in step 1435. Then, the terminal continues the communication using the recently assigned time slot vs n+1 in the cell to which the terminal will move in step 1437.

Figure 17A:
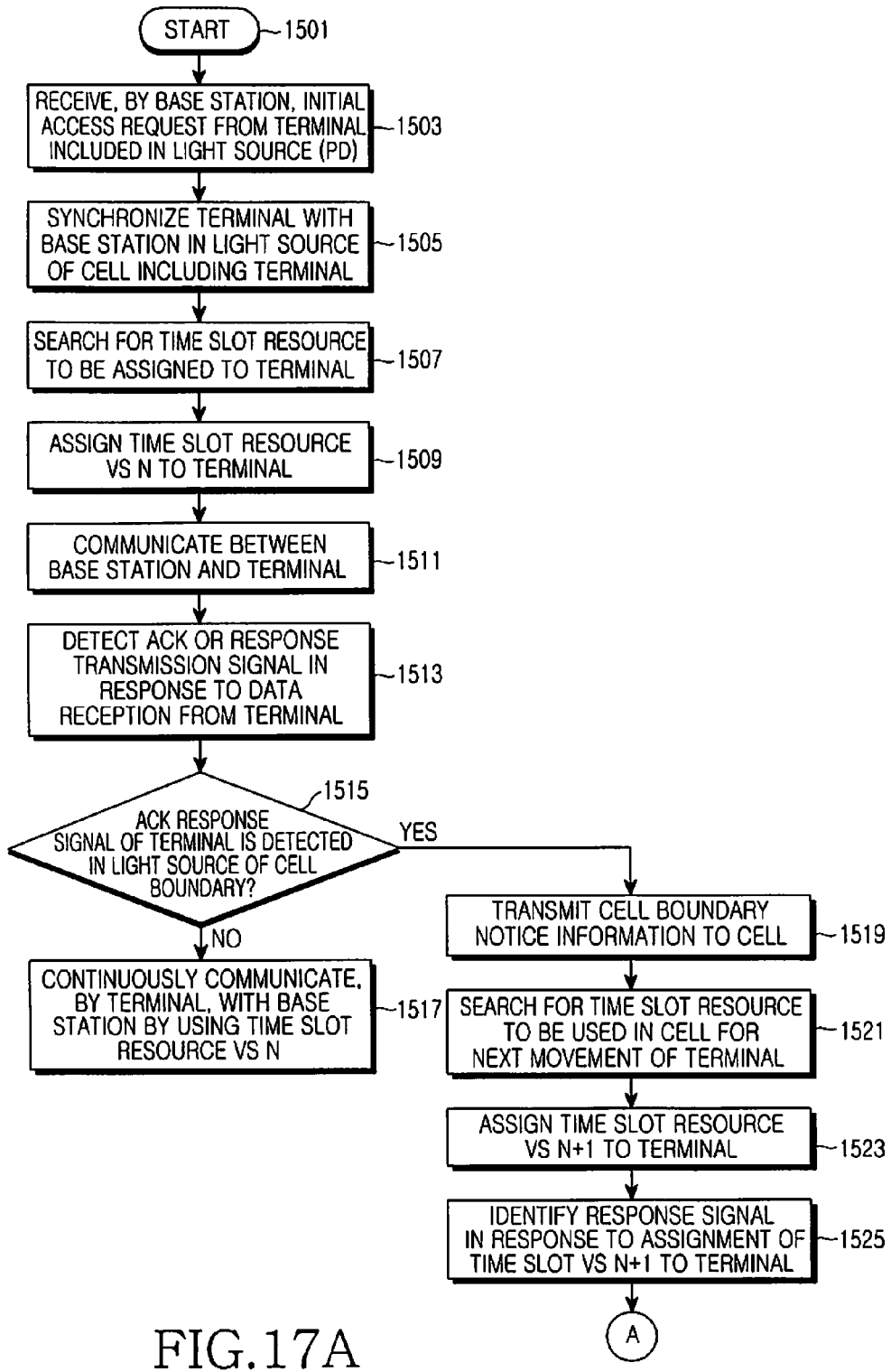
FIGS. 17A and 17B are flowcharts illustrating an operation of a base station, according to an embodiment of the present invention.
Figure 17B:
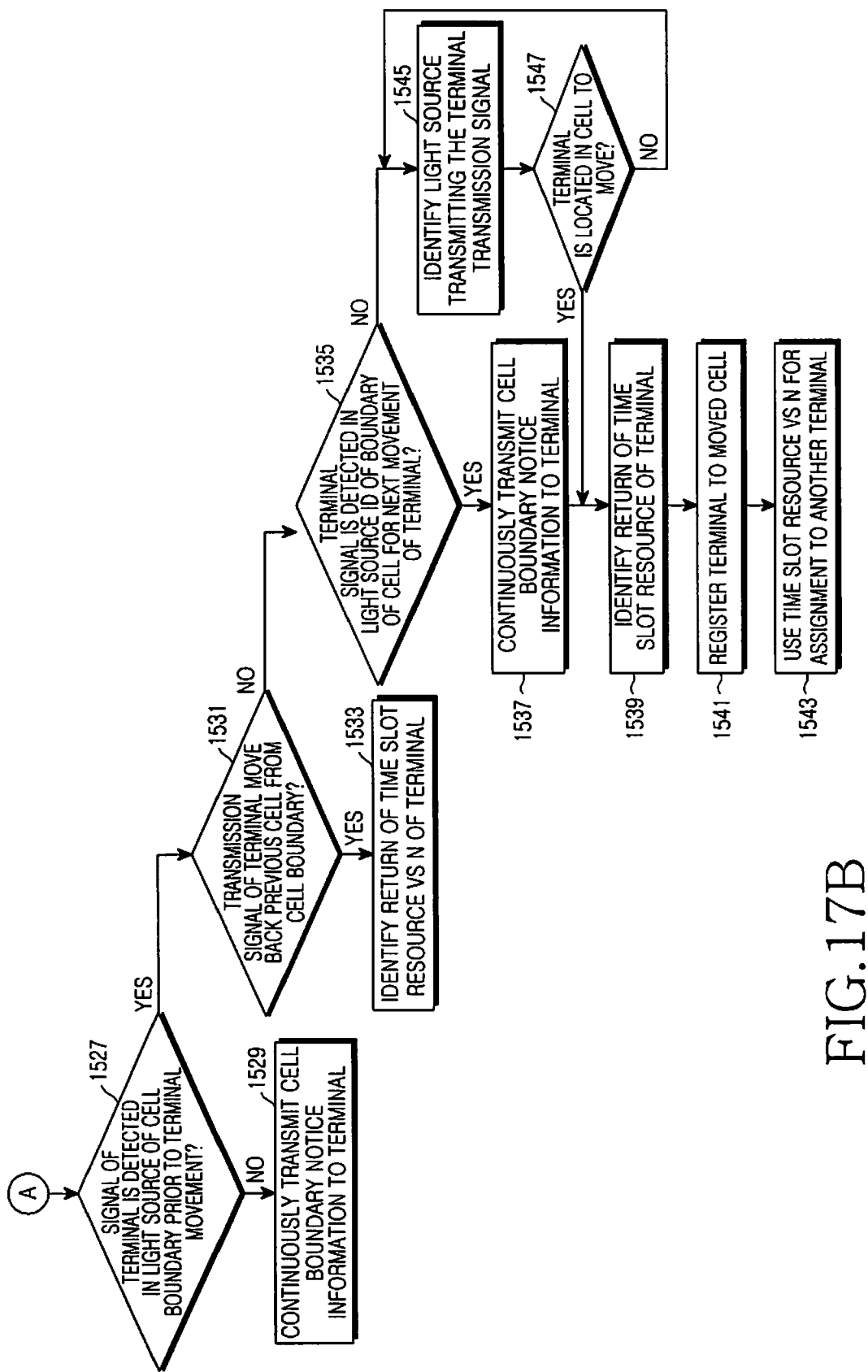

FIGS. 17A and 17B illustrate an operation of the base station AP, according to an embodiment of the present invention. When the base station receives an initial access request from the terminal located in a service area of a certain light source in step 1503, the base station identifies a cell including the light source and makes synchronization with the corresponding terminal through the light source in step 1505. The base station searches for a time slot resource to be assigned to the terminal in step 1507, and assigns the time slot vs n to the terminal in step 1509. Then, the base station communicates with the terminal by using the time slot vs n in step 1511, and detects ACK or a response transmission signal in response to the data reception from the terminal in step 1513. The terminal identifies if the ACK or the response signal is detected in the light source located in a boundary area of the corresponding cell in step 1515. When the ACK or the response signal is not detected, the terminal continues the service by using the currently assigned time slot vs n in step 1517.

However, when the ACK or the response signal of the terminal is received through the light source located in the boundary area of the corresponding cell in step 1515, the base station transmits the cell boundary notice information to the terminal in step 1519. The base station searches for a time slot resource currently used or scheduled to be used in the cell to which the terminal may move in step 1521. The cell, to which the terminal will move, refers to a cell adjacent to the cell in which the terminal is currently located. The base station assigns a single time slot vs n+1 among the assignable time slot resources, except for the time slot resource searched in step 1521, to the terminal in step 1523. After the assignment of new time slot resource to the terminal, the base station identifies if a response signal in response to the time slot resource assignment is received in step 1525.

Then, the base station identifies if a signal of the terminal is received through the light source located in the boundary area of the cell prior to the movement of the terminal in step 1527. When the signal of the terminal is received, the base station continuously transmits the cell boundary notice information to the terminal in step 1529. When the signal of the terminal is not received through the light source located in the boundary area of the cell prior to the movement of the terminal, the base station receives the transmission signal of the terminal and identifies if the light source transmitting the transmission signal corresponds to the light source located in the stable region of the previous cell in step 1531. The stable region refers to a region except for the cell boundary area in the cell. When the signal of the terminal is received through the light source located in the stable region of the cell, the base station identifies the return of the time slot vs n in step 1533.

However, when the signal of the terminal is not received through the light source located in the stable region of the cell, the base station identifies if the signal of the terminal is transmitted through the light source located in the boundary area of the cell to which the terminal will move in step 1535. When the signal of the terminal is transmitted through the light source located in the boundary area of the cell, the base station continuously transmits the cell boundary notice information to the terminal in step 1537. Then, the base station identifies if the time slot vs n is returned in step 1539, and registers the terminal to the cell to which the terminal moves in step 1541. Next, the base station assigns the time slot resource of which the return has been identified in step 1539 to another terminal for use in step 1543.

When the signal of the terminal is not transmitted through the light source located in the boundary area of the cell to which the terminal will move in step 1535, the base station continuously identifies through which light source the signal of the terminal is received in step 1545. When it is identified that the terminal is located in the cell to move to in step 1547, it proceeds to step 1539. However, when it is identified that the terminal is not located in the cell to move to in step 1547, the base station continuously identifies a relevant light source.

Although the above embodiment is based on a case where a specific ID is designated to each light source including at least one LED and at least one PD, it is possible, according to another embodiment of the present invention, to separately indicate an LED and a PD included in a single light source by different IDs, respectively. Otherwise, each LED or each PD may be individually indicated by a specific ID.

Figure 18:
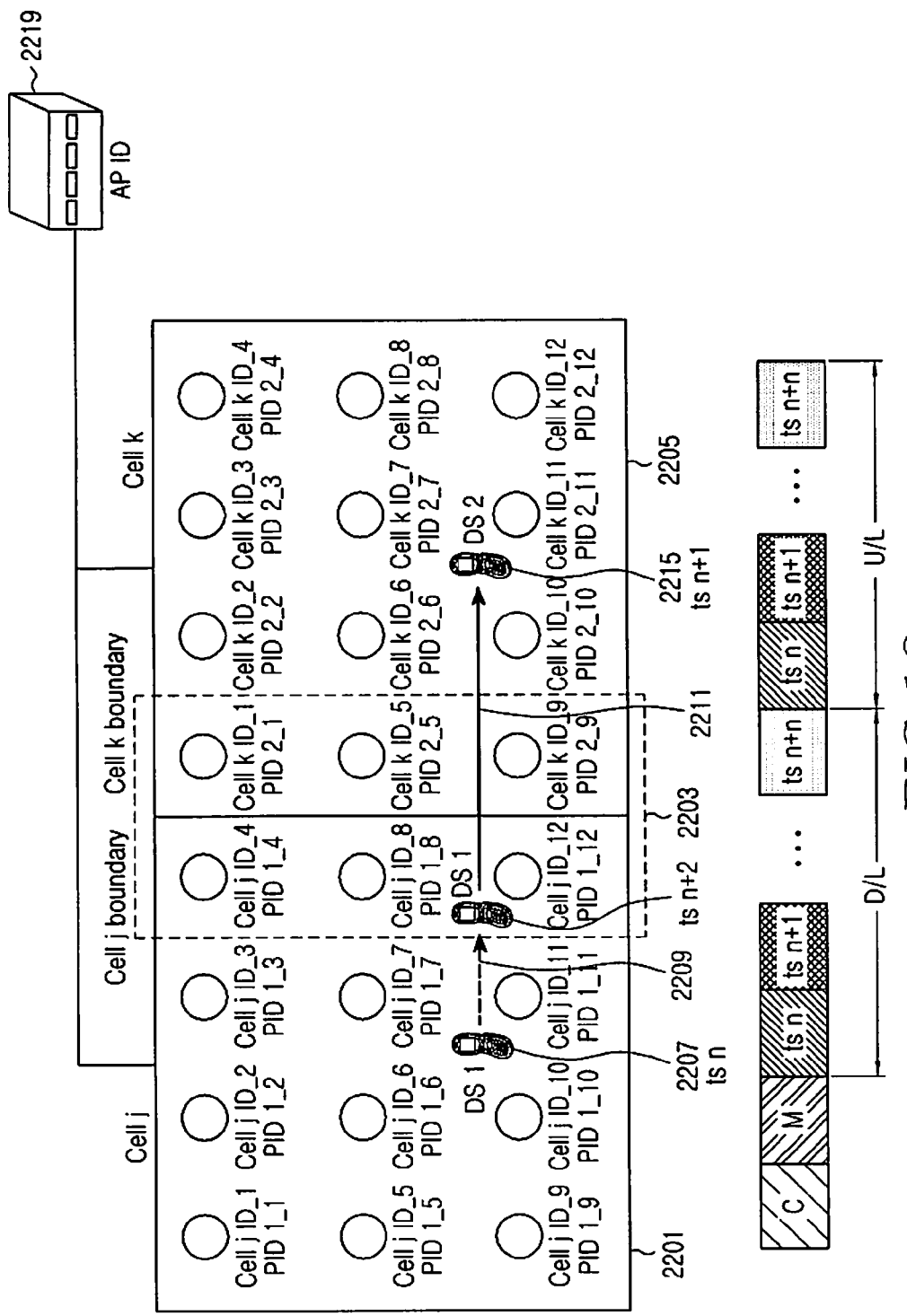
FIGS. 18 and 19 are diagrams illustrating movement of a terminal between adjacent cells, according to another embodiment of the present invention.
Figure 19:
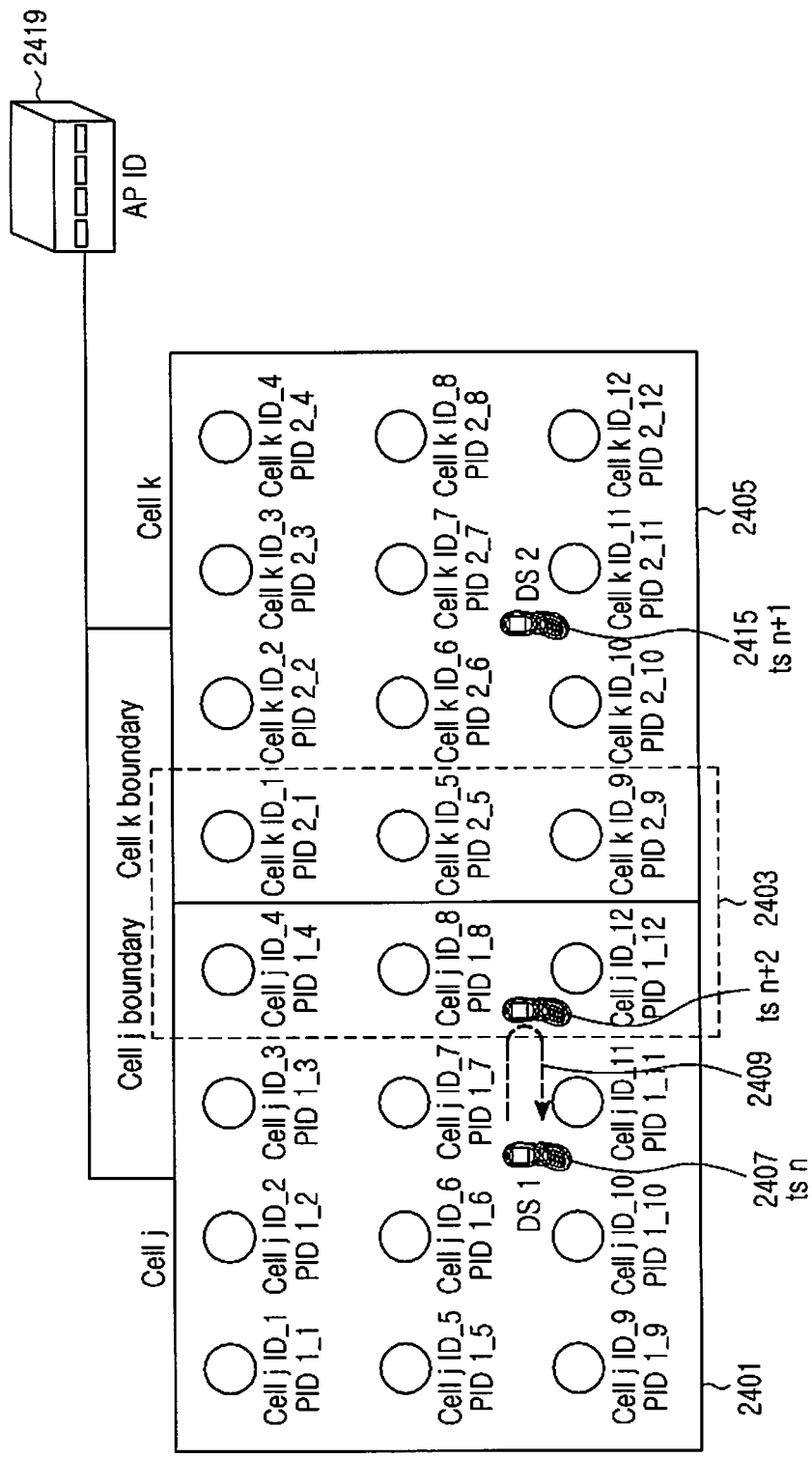

FIGS. 18 and 19 illustrate the movement of the terminal between adjacent cells according to another embodiment of the present invention.

On an assumption that a boundary area to which a cell j 2201 and a cell k 2205 are adjacent is a boundary area 2203, when a terminal DS1 2207 moves from the cell j 2201 to the cell k 2205 in directions 2209 and 2211, the terminal DS1 2207 has to pass by the boundary area 2203 to which the cell j 2201 and the cell k 2205 are adjacent. Each of the cells includes multiple light sources functioning as the transmission unit and multiple PDs functioning as the reception unit. Each of the light sources and the PDs has the individual ID, so that the ID of each of the light sources and the PDs is used for the time resource assignment for the mobility. It is possible to make a single ID through combining the ID of each of the light sources and the ID of each of the PDs. Further, data or a control signal is transmitted/received between the terminal DS belonging to the cell connected to the AP 2219 and the AP 2219 by using the each of the light sources and the PDs. When the terminal DS1 2207 located in the cell j 2201 moves to the cell k 2205, the terminal DS1 2207 passes by the boundary area 2203 included in each of the cells. When the terminal DS1 2207 is assigned a time slot ts n in the cell j 2201 from the AP 2219 and the terminal DS1 2207 communicates with the AP 2219 by using the time slot ts n, every light source included in the cell j 2201 in which the terminal DS1 2207 is located transmits the DL data or the control signal transmitted from the AP 2219 to the terminal DS1 2207 during the time slot ts n assigned to the terminal DS1 2207. However, there is a high probability that the terminal DS1 2207 actually receives the DL data or the control signal transmitted from the light source that is the closest to the cell j 2201, so that the terminal DS1 2207 receives the DL data or the control signal from the cell light source Cell j ID_7 in the cell j 2201. Therefore, the terminal DS1 2207 detects the light source ID from the DL data or the control signal and recognizes the ID of the light source that currently provides the service in the cell j 2201. Further, an AP ID is transmitted together with the UL data or the control signal, so that the terminal DS1 2207 can discriminate the AP by using the AP ID. When the terminal DS1 2207 transmits the UL signal in response to the DL signal, the terminal DS1 2207 transmits the UL signal by using the assigned time slot ts n. In this case, when the terminal DS1 2207 does not move in the cell j 2201, the terminal DS1 2207 transmits the UL signal in the area of the light source Cell j ID_7 receiving the DL signal and the UL signal is received in the PID 1_7, so that the AP 2219 controlling the PID 1_7 can be aware that the current terminal DS1 2207 is located in the PID 1_7 within the cell j 2201. Therefore, the AP 2219 and the terminal DS1 2207 can recognize the AP ID transmitted through the DL and the transmission light source ID, respectively, and the AP can identify the position within the cell of the terminal DS1 2207 transmitted through the UL by using the PID 1_7.

When the terminal DS1 2207 moves and approaches the boundary area 2203, the light sources included in the cell j 2201 DL/UL communicate with the terminal DS1 2207 by using the time slot ts n, so that the light source Cell j ID_8 provides the terminal DS1 2207 with the DL service in the cell j 2201 during the time slot ts n. Therefore, even if the terminal DS1 2207 moves to the cell boundary area 2203, the terminal DS1 2207 continuously receives the DL service. Further, the terminal DS1 2207 receives the DL service by using the light source ID Cell j ID_8 after the movement, so that the terminal DS1 2207 can recognize that the light source ID is changed. That is, the terminal DS1 2207 can recognize that the light source ID is changed from Cell j ID_7 to Cell j ID_8 through the DL. Further, when the terminal DS1 2207 approaches the boundary area 2203 in the direction 2209, the AP 2219 can recognize the movement of the terminal DS1 2207 by using the change of the PID, which is received during the transmission of the UL by the terminal DS1 2207, from PID 1_7 to PID 1_8. Therefore, when the terminal DS1 2207 enters the boundary area 2203, the AP 2219 informs the boundary information and additionally assigns a time slot ts n+2 to be used in the cell 2205 to the terminal DS1 2207 according to the movement of the terminal DS1 2207 in the direction 2211. The additionally assigned time slot resource is the time slot resource which is not used by a terminal DS2 located in the cell 2201 and the cell 2205.

In FIG. 18, the terminal DS1 2207 transmits/receives data with the light source and the PDS connected with the AP 2219 by using the time slot ts n being used in the cell j 2201. Further, when the terminal DS1 2207 moves in the direction 2209 and approaches the boundary area 2203, the AP 2219 assigns the additional time slot ts n+2 to the terminal DS1 2207 by using the time slot ts n together with the boundary information.

The PID 1_8 receives the UL transmitted by the terminal DS1 2207 and the AP 2219 transmits the boundary information by using Cell j ID_8 because the terminal DS1 2207 is located in the boundary area 2203. At this time, the terminal DS1 2207 is assigned the time slot ts n+2 from the light source Cell j ID_8 included in the boundary area 2203. The boundary information can be transmitted through each of the light sources, Cell j ID_4, Cell j ID_8, Cell j ID_12, Cell k ID_1, Cell k ID_5, and Cell k ID_9, or the time slot ts n+2 can be assigned through only the light source Cell j ID_8 in which the terminal DS1 2207 is located.

The time slot resources currently assigned to the terminal DS1 2207 are ts n and ts n+2. In order to return one of the assigned time slot resources to the AP 2219, the terminal DS1 2207 may determine the change of the light source ID information according to a movement of the terminal DS1 2207, which is transmitted in the DL, when the terminal DS1 2207 located in the boundary area 2203 moves from the Cell J ID_8 to Cell k ID_5. Therefore, when the light source ID through the DL changes, the terminal DS1 2207 makes a request for a return of the previously used time slot ts n among the currently assigned time slot resources to the AP 2219 through the UL. According to another method of returning the time slot resource, when the terminal DS1 2207 passes by the boundary area 2203 and moves to the cell k 2205, the terminal DS1 2207 fails to receive the boundary information transmitted from the boundary area 2203, so that the terminal DS1 2207 makes a request for the return of the previously assigned time slot ts n among the two assigned time slot resources to the AP 2219 through the UL. In this process, when the terminal DS1 2207 receives the response confirmation with respect to the return of the time resource from the AP 2219, the terminal DS1 2207 UL/DL communicates with the AP 2219 by using only the time slot ts n+2. A frame 2217 represents a TDD (Time Division Duplex) frame for the assigned time slot resources. The VLC frame 2217 includes the DL through which the AP 2219 transmits the data and control information by using the light source and the UL through which the terminal DS1 transmits the data and control information to the AP 2219 by using the PID.

Further, in FIG. 18, when the terminal DS1 2207 receives the DL signal from the light source Cell j ID_8 in the boundary area 2203 and then moves to the light source Cell j ID_4 or Cell j ID_12, the terminal DS1 2207 comes to know that the DL light source ID is changed from the Cell j ID_8 to Cell j ID_4 or Cell j ID_12, so that the terminal DS1 2207 can make a request for the return of the previously assigned time slot ts n between the time slots ts n and ts n+2 assigned from the AP 2219 to the AP 2219. According to another method of returning the time slot resource, as soon as the terminal DS1 2207 is additionally assigned the time slot ts n+2 from the AP 2219, the terminal DS1 2207 operates a timer and then makes a request for the return of the previously assigned time slot ts n to the AP 2219 through the UL after a preset time. According to another method of returning the time slot resource, when the light source ID transmitting the cell boundary information through the DL, the terminal can make a request for the return of the previously assigned ts n between the time slots ts n and ts n+2 assigned from the AP 2219 to the AP 2219 through the UL. According to another method of the time resource return, when the terminal DS1 2207 enters the cell k 2205 from the cell k boundary and fails to receives the cell k boundary information, the terminal DS1 2207 makes a request for the return of the previously assigned ts n between the time slots ts n and ts n+2 assigned from the AP 2219 to the AP 2219 through the UL. FIG. 19 illustrates the process of the return of the time slot resource when the terminal DS1 2207 is assigned the time slot ts n+2 from the AP 2219 in the cell j boundary 2403 and moves back to the cell j 2401.

The process in which the DS1 2407 approaches the cell j boundary 2403 and is assigned the time slot ts n+2 is identical to that of FIG. 18. However, in FIG. 19, in the event that the terminal DS1 2407 has had the additionally assigned time slot ts n+2 when it moves back to the cell j 2401 in a direction 2409, the terminal DS1 2407 returns the time slot resource between the time slots ts n and ts n+2 to the AP 2219. When the terminal DS1 2407 moves back to the cell j 2401 and fails to receive the cell j boundary information transmitted from the cell boundary area 2403, the terminal DS1 2407 transmits a request for the return of the previously assigned time slot ts n to the AP through the UL. When the light source Cell j ID_8 transmits the cell j boundary information and assigns the time slot ts n+2 to the terminal DS1 2407, and then the terminal DS1 2407 moves to the light source Cell j ID_7 and fails to receive the cell j boundary information, the terminal DS1 2407 transmits a request for the return of the previously used time slot ts n to the AP 2219 to the PID 1_7. Further, the AP 2219 transmits a response according to the request for the return of the time slot ts n of the terminal DS1 2407 received in the PID 1_7 by using the light source Cell j ID_7 through the DL.

Table 2 illustrates an example of the frame information of the description of FIGS. 18 and 19. Referring to Table 2, it can be noted that a DS_ID field includes a Device ID and a Cell_info field includes an Optical resource ID.

TABLE 2

| Management payload filed | bit | Usage/Description | Down/Up Link |
| --- | --- | --- | --- |
| Src_multi_info | 7 | Available channels information in Coordinator(Access Point)<br>ex: 0000000 No multiple channel mode<br>ex: 0000001 using channel "A"<br>ex: 0000101 using channel "A" and "C" | D/L |
| Des_multi_info | 7 | Available channels information in mobile device<br>ex: 0000000 No multiple channel mode<br>ex: 0000001 using channel "A"<br>ex: 0000101 using channel "A" and "C" | U/L |
| H_pattern | 5 | Channels hopping information | D/L |
| VF_info_type | 1 | Using Visible Frame transmission<br>ex 1: Receiver transmit the Visible Frame<br>ex 0: Receiver Does Not transmit the Visible Frame | D/L |
| G_cell_ID | 10 | Granular cell size | D/L |
| Fractional_Src | 2 | Using fractional resource assignment<br>ex 1: yes(fractional resource assignment)<br>ex 0: no (general resource assignment) | D/L |
| Mode type | 2 | Mode type<br>ex 1: multicast | D/L |
| S_Release_slot | 5 | The start slot and release slot information for broadcast mode | D/L |
| Spatial mobility | 2 | Using Spatial mobility | D/L |
| DS_ID | 10 | Device ID | D/L, U/L |
| Number of Time slot | 5 | Assigned time slot number | D/L |
| Cell_info | 10 | Cell ID, Optical Source ID, AP ID(D/L) PD_ID(U/L)<br>ex: Celln_ID_n | D/L, U/L |
| B_info | 2 | Cell boundary information | D/L |
| S_info | 5 | Time slot assignment and response(D/L) Request(U/L) | D/L, U/L |

While the present invention has been shown and described with reference to certain embodiments and drawings thereof, it will be understood by those skilled in the art that various changes in form and detail may be made therein without departing from the spirit and scope of the invention as defined by the appended claims.

What is claimed is:

1. A visible light communication method in a visible light coordinator, which discriminates between at least one communication area cell that includes at least one light source and a boundary area positioned between the communication area cell and another communication area cell adjacent to the communication cell area, and which provides time division visible light communication, the method comprising the steps of:
   detecting a position of a visible light communication terminal;
   determining a first communication area cell corresponding to the position of the detected visible light communication terminal;
   determining a first time slot for receiving data of the visible light communication terminal in the first communication area cell;
   assigning a second time slot, which has not been assigned to the visible light communication terminal, to the visible light communication terminal, when the visible light communication terminal is located in a boundary area of the first communication area cell; and
   communicating with the visible light communication terminal using the second time slot.

2. The method as claimed in claim 1, wherein detecting the position comprises:
   identifying a light source receiving data transmitted from the visible light communication terminal; and
   determining that the visible light communication terminal is located in the boundary area when the light source corresponds to a light source included the boundary area, and determining that the visible light communication terminal is located in a stable region when the light source corresponds to a light source included in the stable region of the first communication area cell, except for the boundary area.

3. The method as claimed in claim 1, wherein the second time slot is a time slot that is not used in the first communication area cell and a second communication area cell adjacent to the first communication area cell.

4. The method as claimed in claim 2, wherein in communicating with the visible light communication terminal, the visible light communication terminal communicates using the first time slot and the second time slot.

5. The method as claimed in claim 4, further comprising stopping the communication with the visible light communication terminal using the first time slot, when a response corresponding to the second time slot is received from the visible light communication terminal.

6. The method as claimed in claim 4, further comprising stopping the communication with the visible light communication terminal using the first time slot, when the light source receiving the data transmitted from the visible light communication terminal corresponds to the light source included in the stable region.

7. The method as claimed in claim 4, further comprising stopping the communication with the visible light communication terminal using the first time slot, when the light source receiving the data transmitted from the visible light communication terminal corresponds to the light source included in the second communication area cell.

8. The method as claimed in claim 7, wherein an ID of the light source receiving the data transmitted from the visible light communication terminal is an ID of the adjacent communication are cell.

9. The method as claimed in claim 4, further comprising stopping the communication with the visible light communication terminal using the first time slot, when the light source receiving the data transmitted from the visible light communication terminal corresponds to the light source included in the stable region of the second communication area cell.

10. The method as claimed in claim 4, further comprising stopping the communication with the visible light communication terminal using the first time slot, when the second time slot has been assigned and then a predetermined time passes.

11. The method as claimed in claim 1, wherein boundary area notice information is transmitted through the light source included in the boundary area.

12. A visible light coordinator, which discriminates between at least one communication area cell that includes at least one light source and a boundary area positioned between the communication area cell and another communication area cell adjacent to the communication area cell, and which provides time division visible light communication, the visible light coordinator comprising:
 a memory for storing information of the at least one communication area cell; and
 a controller for detecting a position of a visible light communication terminal, determining a first communication area cell corresponding to the position of the detected visible light communication terminal, determining a first time slot for receiving data of the visible light communication terminal in the first communication area cell, assigning a second time slot, which has not been assigned to the visible light communication terminal, to the visible light communication terminal when the visible light communication terminal is located in a boundary area of the first communication area cell, and communicating with the visible light communication terminal by using the second time slot.

13. The visible light coordinator as claimed in claim 12, wherein the controller, in order to detect the position of the visible light communication terminal, identifies a light source receiving data transmitted from the visible light communication terminal, determines that the visible light communication terminal is located in the boundary area when the light source corresponds to a light source included in the boundary area, and determines that the visible light communication terminal is located in a stable region when the light source corresponds to a light source included in the stable region, which is a region of the first communication area cell, except for the boundary area.

14. The visible light coordinator as claimed in claim 12, wherein the second time slot is a time slot that is not used in the first communication area cell and a second communication area cell adjacent to the first communication area cell.

15. The visible light coordinator as claimed in claim 13, wherein the controller communicates with the visible light communication terminal using the first time slot and the second time slot.

16. The visible light coordinator as claimed in claim 13, wherein the controller stops the communication with the visible light communication terminal using the first time slot when a response corresponding to the second time slot is received from the visible light communication terminal.

17. The visible light coordinator as claimed in claim 13, wherein the controller stops the communication with the visible light communication terminal using the first time slot when the light source receiving the data transmitted from the visible light communication terminal corresponds to the light source included in the stable region.

18. The visible light coordinator as claimed in claim 13, wherein the controller stops the communication with the visible light communication terminal using the first time slot when the light source receiving the data transmitted from the visible light communication terminal corresponds to the light source included in the second communication area cell.

19. The visible light coordinator as claimed in claim 13, wherein the controller stops the communication with the visible light communication terminal using the first time slot when the light source receiving the data transmitted from the visible light communication terminal corresponds to the light source included in the stable region of the second communication area cell.

20. The visible light coordinator as claimed in claim 13, wherein the controller stops the communication with the visible light communication terminal using the first time slot when the second time slot has been assigned and then a predetermined time passes.

21. The visible light coordinator as claimed in claim 12, wherein boundary area notice information is transmitted through the light source included in the boundary area.

* * * * *